US012348759B2

(12) United States Patent
Zhang et al.

(10) Patent No.: US 12,348,759 B2
(45) Date of Patent: *Jul. 1, 2025

(54) CONCEPT OF INTERWEAVED PREDICTION

(71) Applicants: Beijing Bytedance Network Technology Co., Ltd., Beijing (CN); Bytedance Inc., Los Angeles, CA (US)

(72) Inventors: Kai Zhang, San Diego, CA (US); Li Zhang, San Diego, CA (US); Hongbin Liu, Beijing (CN); Yue Wang, Beijing (CN)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/514,228

(22) Filed: Nov. 20, 2023

(65) Prior Publication Data
US 2024/0107053 A1    Mar. 28, 2024

Related U.S. Application Data

(63) Continuation of application No. 16/951,137, filed on Nov. 18, 2020, now Pat. No. 11,871,022, which is a (Continued)

(30) Foreign Application Priority Data

May 31, 2018    (WO) ................ PCT/CN2018/089242

(51) Int. Cl.
*H04N 19/513*    (2014.01)
*H04N 19/105*    (2014.01)
(Continued)

(52) U.S. Cl.
CPC ......... *H04N 19/513* (2014.11); *H04N 19/105* (2014.11); *H04N 19/119* (2014.11); *H04N 19/176* (2014.11); *H04N 19/573* (2014.11)

(58) Field of Classification Search
CPC .. H04N 19/105; H04N 19/176; H04N 19/513; H04N 19/573
See application file for complete search history.

(56) References Cited

U.S. PATENT DOCUMENTS 6,489,995 B1    12/2002    Kok
6,807,231 B1    10/2004    Wiegand
(Continued)

FOREIGN PATENT DOCUMENTS

CN        101252686 A    8/2008
CN        101350920 A    1/2009
(Continued)

OTHER PUBLICATIONS

Flierl et al. "Multihypothesis Pictures for H.26L," Proceedings 2001 International Conference on Image Processing, ICIP 2001—Thessaloniki, Greece, Oct. 7-10, 2001, Institute of Electrical and Electronics Engineers, New York, NY, 2001, 3:526-529.
(Continued)

*Primary Examiner* — Jeremiah C Hallenbeck-Huber
(74) *Attorney, Agent, or Firm* — Conley Rose, P.C.

(57) ABSTRACT

Methods, systems, and devices related to sub-block based motion prediction in video coding are described. In one representative aspect, a video processing method includes partitioning a video block into a first set of sub-blocks according to a first pattern, partitioning the video block into a second set of sub-blocks according to a second pattern, in which at least one sub-block in the second set has a different size than a sub-block in the first set, and determining a prediction block corresponding to a combination of a first
(Continued)

intermediate prediction block that is predictively generated from the first set of sub-blocks and a second intermediate prediction block that is predictively generated from the second set of sub-blocks.

19 Claims, 23 Drawing Sheets

Related U.S. Application Data continuation of application No. PCT/IB2019/054467, filed on May 30, 2019.

(51) Int. Cl.
*H04N 19/119* (2014.01)
*H04N 19/176* (2014.01)
*H04N 19/573* (2014.01)

(56) References Cited

U.S. PATENT DOCUMENTS

| | | | |
|---|---|---|---|
| 7,801,217 B2 | 9/2010 | Boyce | |
| 8,204,109 B2 | 6/2012 | Xiong | |
| 9,544,601 B2 | 1/2017 | Zhao | |
| 9,736,481 B2 | 8/2017 | Zhang | |
| 9,860,559 B2 | 1/2018 | Zhang | |
| 9,860,562 B2 | 1/2018 | Zhang | |
| 9,912,925 B2 | 3/2018 | Ye | |
| 9,986,257 B2 | 5/2018 | Zhang | |
| 9,998,742 B2 | 6/2018 | Chen | |
| 10,057,578 B2 | 8/2018 | Rapaka | |
| 10,277,910 B2 | 4/2019 | Xiu | |
| 10,375,411 B2 | 8/2019 | Zhao | |
| 10,440,340 B2 | 10/2019 | Ye | |
| 10,462,439 B2 | 10/2019 | He | |
| 10,469,847 B2 | 11/2019 | Xiu | |
| 10,477,214 B2 | 11/2019 | Zhang | |
| 10,812,835 B2 | 10/2020 | Wang | |
| 2003/0031258 A1 | 2/2003 | Wang | |
| 2006/0193388 A1 | 8/2006 | Woods | |
| 2006/0268166 A1* | 11/2006 | Bossen | H04N 19/463 375/E7.199 |
| 2008/0101707 A1 | 5/2008 | Mukherjee | |
| 2009/0232207 A1 | 9/2009 | Chen | |
| 2010/0118943 A1 | 5/2010 | Shiodera | |
| 2011/0122942 A1 | 5/2011 | Kudana | |
| 2011/0200110 A1 | 8/2011 | Chen | |
| 2012/0082224 A1 | 4/2012 | Van der Auwera | |
| 2012/0219216 A1 | 8/2012 | Sato | |
| 2013/0128974 A1 | 5/2013 | Chien | |
| 2014/0044179 A1* | 2/2014 | Li | H04N 19/30 375/240.16 |
| 2014/0192883 A1 | 7/2014 | Seregin | |
| 2015/0016528 A1 | 1/2015 | Wang | |
| 2015/0341657 A1 | 11/2015 | Onno | |
| 2015/0350687 A1 | 12/2015 | Zhai | |
| 2015/0373343 A1 | 12/2015 | Hendry | |
| 2016/0100163 A1 | 4/2016 | Rapaka | |
| 2017/0048552 A1 | 2/2017 | An | |
| 2017/0168709 A1 | 6/2017 | Zhong | |
| 2017/0214932 A1 | 7/2017 | Huang | |
| 2017/0223377 A1 | 8/2017 | Bankoski | |
| 2017/0332099 A1 | 11/2017 | Lee | |
| 2018/0014017 A1 | 1/2018 | Li | |
| 2018/0048889 A1 | 2/2018 | Zhang | |
| 2018/0070105 A1 | 3/2018 | Jin | |
| 2018/0131943 A1 | 5/2018 | Park | |
| 2018/0184117 A1 | 6/2018 | Chen | |
| 2018/0192069 A1 | 7/2018 | Chen | |
| 2018/0213239 A1 | 7/2018 | Mukherjee | |
| 2018/0241998 A1 | 8/2018 | Chen | |
| 2018/0270500 A1 | 9/2018 | Li | |
| 2018/0278950 A1 | 9/2018 | Chen | |
| 2019/0045192 A1 | 2/2019 | Socek | |
| 2019/0230350 A1* | 7/2019 | Chen | H04N 19/139 |
| 2019/0246122 A1 | 8/2019 | Zhang | |
| 2019/0273943 A1 | 9/2019 | Zhao | |
| 2019/0379870 A1 | 12/2019 | Ye | |
| 2020/0112740 A1 | 4/2020 | Chien | |
| 2020/0221120 A1 | 7/2020 | Robert | |
| 2020/0228815 A1 | 7/2020 | Xu | |
| 2021/0029356 A1 | 1/2021 | Zhang | |
| 2021/0297673 A1 | 9/2021 | Zhang | |
| 2021/0329250 A1 | 10/2021 | Zhang | |
| 2022/0312016 A1 | 9/2022 | Zhang | |

FOREIGN PATENT DOCUMENTS

| | | |
|---|---|---|
| CN | 101491107 A | 7/2009 |
| CN | 101621693 A | 1/2010 |
| CN | 101626505 A | 1/2010 |
| CN | 101766030 A | 6/2010 |
| CN | 101833768 A | 9/2010 |
| CN | 102037732 A | 4/2011 |
| CN | 102577388 A | 7/2012 |
| CN | 104168483 A | 11/2014 |
| CN | 104244002 A | 12/2014 |
| CN | 104488271 A | 4/2015 |
| CN | 105103554 A | 11/2015 |
| CN | 105580365 A | 5/2016 |
| CN | 105723707 A | 6/2016 |
| CN | 105791858 A | 7/2016 |
| CN | 106303544 A | 1/2017 |
| CN | 106464885 A | 2/2017 |
| CN | 106688237 A | 5/2017 |
| CN | 106797476 A | 5/2017 |
| CN | 107079150 A | 8/2017 |
| CN | 107092787 A | 8/2017 |
| CN | 107231557 A | 10/2017 |
| CN | 108028933 A | 5/2018 |
| CN | 108109629 A | 6/2018 |
| CN | 108271023 A | 7/2018 |
| CN | 108293131 A | 7/2018 |
| CN | 108432250 A | 8/2018 |
| CN | 108702509 A | 10/2018 |
| CN | 108781282 A | 11/2018 |
| CN | 113454999 B | 7/2024 |
| CN | 113348669 B | 8/2024 |
| CN | 113597760 B | 8/2024 |
| EP | 1658726 A2 | 5/2006 |
| JP | 2010068103 A | 3/2010 |
| KR | 20140146541 A | 12/2014 |
| TW | 200644644 A | 12/2006 |
| TW | 201433153 A | 8/2014 |
| TW | 201507443 A | 2/2015 |
| TW | 201820872 A | 6/2018 |
| TW | 201841505 A | 11/2018 |
| TW | 201902214 A | 1/2019 |
| TW | I850252 B | 8/2024 |
| WO | 2015196126 A1 | 12/2015 |
| WO | 2017059926 A1 | 4/2017 |
| WO | 2018054286 A1 | 3/2018 |
| WO | 2018070152 A1 | 4/2018 |
| WO | 2018226015 A1 | 12/2018 |
| WO | 2019004283 A1 | 1/2019 |
| WO | 2019229705 A1 | 12/2019 |
| WO | 2020008325 A1 | 1/2020 |

OTHER PUBLICATIONS

Chen et al. "Algorithm Description of Joint Exploration Test Model 7 (JEM 7)," Joint Video Exploration Team (JVET) of ITU-T SG 16 WP 3 and ISO/IEC JTC 1/SC 29/WG 11, 7th Meeting: Torino, IT, Jul. 13-21, 2017, document JVET-G1001, 2017.

Zhang et al. "CE4-Related: Interweaved Prediction for Affine Motion Compensation," Joint Video Experts Team (JVET) of ITU-T SG 16 WP 3 and ISO/IECJTC 1/SC 29/WG 11, 11th Meeting, Ljubljana, SI, Jul. 10-18, 2018, document JVET-K0102, 2018.

Boyce, Jill M. "Weighted Prediction in the H.264/MPEG AVG Video Coding Standard," Proceedings/ 2004 IEEE International Syposium on Circuits and Systems, May 23-26, 2004, Sheraton

(56) References Cited

OTHER PUBLICATIONS

Vancouver Wall Centre Hotel, Vancouver British Columbia, Piscataway, NJ, May 23, 2004, pp. 111789-111792.
Zhang et al. "CE4-Related: Simplified Affine Prediction," Joint Video Experts Team (JVET) of ITU-T SG 16 WP 3 and ISO/IEC JTC 1/SC 29/WG 11, 11th Meeting, Ljubljana, SI, Jul. 10-18, 2018, document JVET-K0103, 2018.
Zhang et al. "CE10: Interweaved Prediction for Affine Motion Compensation (Test 10.5.1 and Test 10.5.2)," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0269, 2018.
Zhang et al. "Non-CE2: Interweaved Prediction for Affine Motion Compensation," Joint Video Experts Team (JVET) o ITU-T SG 16 WP 3 and ISO/IEC JTC 1/SC 29/WG 11, 13th Meeting, Marrakech, MA, Jan. 9-18, 2019, document JVET-M0268, 2019.
Luo et al. "CE9: Addressing the Decoding Latency Issue for Decoder-Side Motion Vector Refinement (DMVR)," Joint Video Experts Team (JVET) of ITU-T SG 16 WP 3 and ISO/IEC JTC 1/SC 29/WG 11, 12th Meeting: Macau, CN, Oct. 3-12, 2018, document JVET-L0253, 2018.
Andersson et al. "CE11: Deblocking of Sub-Block Boundaries for Luma," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0074, 2018.
Bordes et al. "CE4-Related: UC with Reduced Memory Buffer," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0203, 2018.
Xiu et al. "CE9-Related: A Simplified Design of Bi-Directional Optical Flow (BIO)," Joint Video Experts Team (JVET) of ITU-T SG 16 WP 3 and ISO/IEC JTC 1/SC 29/WG 11, 12th Meeting, Macao, CN, Oct. 3-12, 2018, document JVET L0591, 2018.
JVET-K0102-v2, Zhang, K., et al., "CE4-related: Interweaved Prediction for Affine Motion Compensation," Bytedance, Jul. 7, 2023, 7 pages.
Document: JVET-L0265, Zhang, K., et al., "CE4: Affine Prediction with 4x4 Sub-blocks for Chroma Components (Test 4.1.16)," Joint Video Experts Team (JVET) of ITU-T SG 16 WP 3 and ISO/IEC JTC 1/SC 29/WG 11 12th Meeting: Macao, CN, Oct. 3-12, 2018, 2 pages.
Document: JVET-M0310-v4, "CE2-related: Using shorter-tap filter for 4x4 sized partition," Joint Video Experts Team (JVET) of ITU-T SG 16 WP 3 and ISO/IEC JTC 1/SC 29/WG 11 13th Meeting: Marrakech, MA, Jan. 9-18, 2019, 7 pages.
Non-Final Office Action from U.S. Appl. No. 17/359,890 dated May 25, 2023.
International Search Report and Written Opinion from PCT/182019/054466 dated Sep. 9, 2019 (18 pages).
International Search Report and Written Opinion from PCT/182019/054467 dated Sep. 9, 2019 (17 pages).
International Search Report and Written Opinion from PCT/182019/054505 dated Sep. 9, 2019 (18 pages).
International Search Report and Written Opinion from PCT/182019/057399 dated Jan. 8, 2020 (17 pages).
International Search Report and Written Opinion from PCT/182019/057400 dated Nov. 6, 2019 (12 pages).
International Search Report and Written Opinion from PCT/CN2020/070113 dated Mar. 26, 2020 (9 pages).
International Search Report and Written Opinion from PCT/CN2020/070115 dated Mar. 24, 2020 (10 pages).
International Search Report and Written Opinion from PCT/CN2020/070119 dated Mar. 26, 2020 (10 pages).
International Search Report and Written Opinion from PCT/CN2020/071660 dated Apr. 13, 2020 (11 pages).
Non-Final Office Action from U.S. Appl. No. 17/342,900 dated Oct. 25, 2021.
Notice of Allowance from U.S. Appl. No. 16/951,137 dated Jul. 24, 2023.
Non-Final Office Action from U.S. Appl. No. 16/951,137 dated Oct. 4, 2022.
Final Office Action from U.S. Appl. No. 16/951,137 dated Apr. 6, 2023.
CHinese Notice of Allowance from Chinese Patent Application No. 202080007867.3 dated May 28, 2024, 6 pages.
Chinese Notice of Allowance from Chinese Patent Application No. 202080007864.X dated Apr. 15, 2024, 7 pages.

* cited by examiner

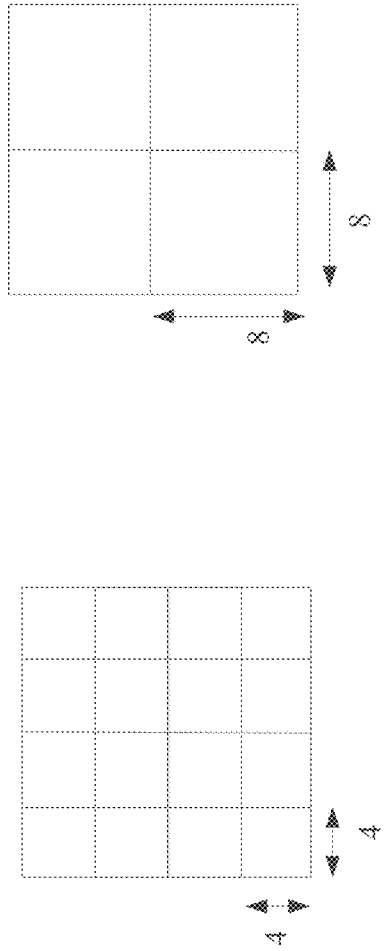
FIG. 14A
FIG. 14B
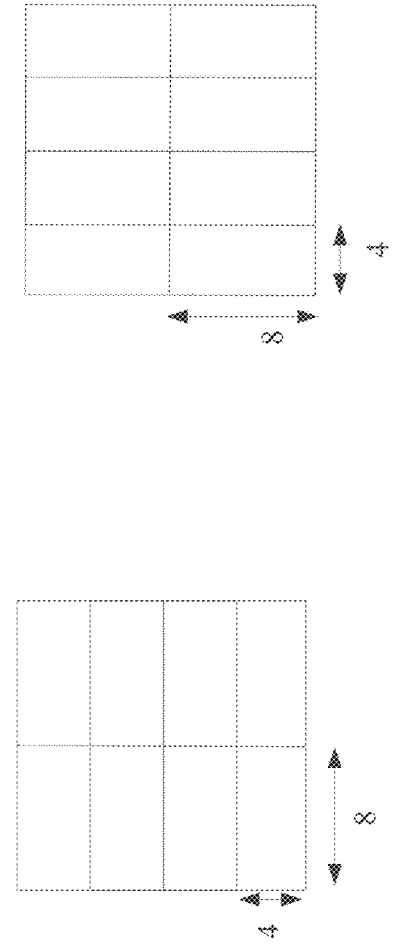
FIG. 14C
FIG. 14D

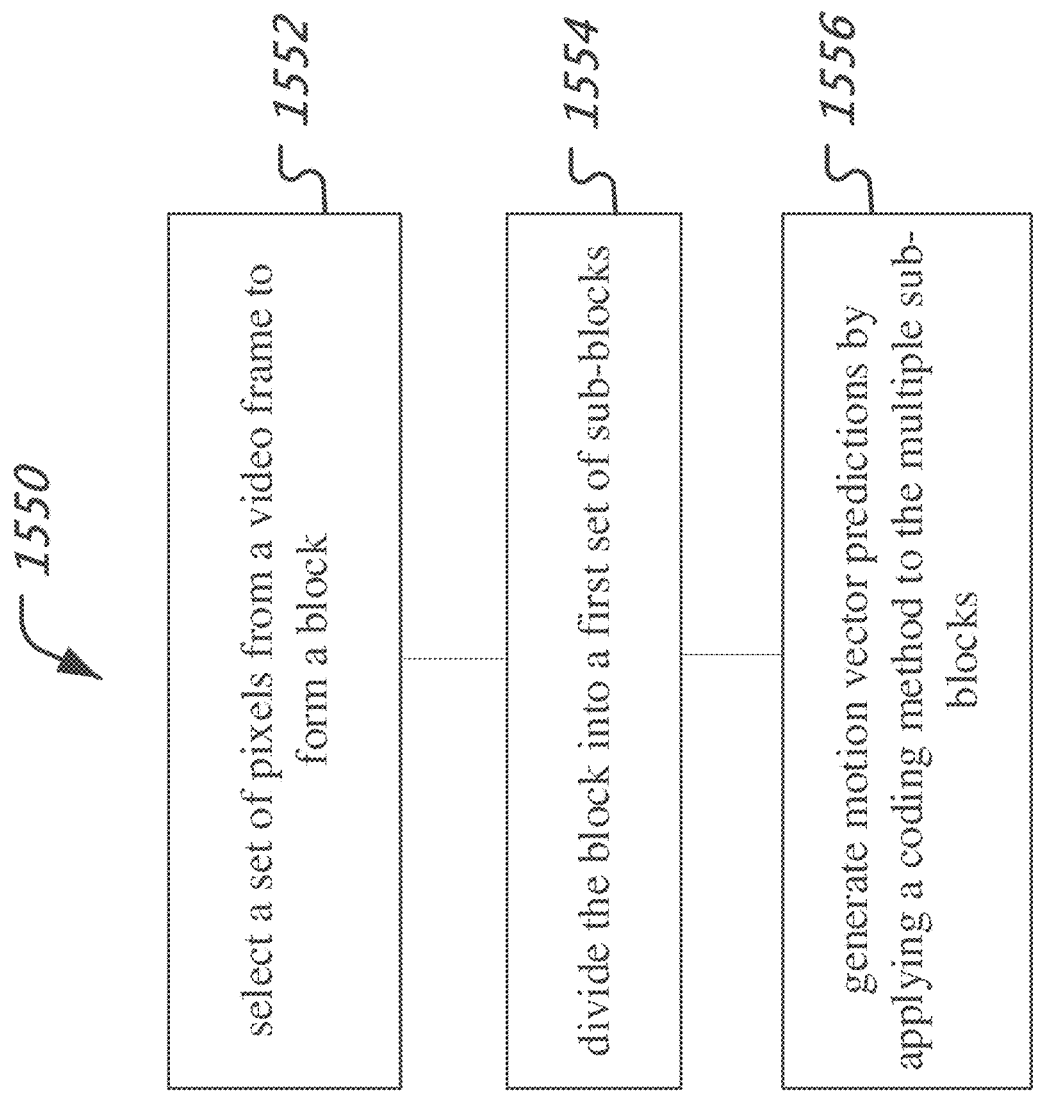

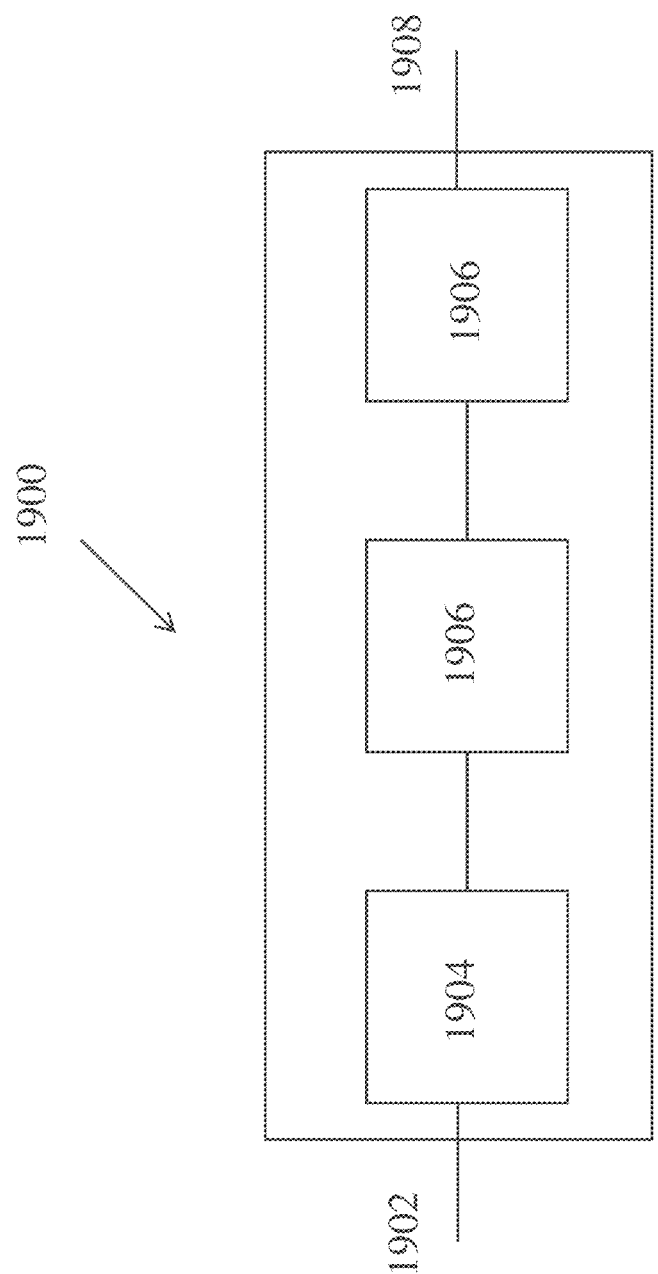

CONCEPT OF INTERWEAVED PREDICTION

CROSS-REFERENCE TO RELATED APPLICATIONS

This application is a continuation of U.S. application Ser. No. 16/951,137, filed Nov. 18, 2020, which is a continuation of International Application No. PCT/IB2019/054467, filed on May 30, 2019, which claims the priority to and benefits of International Patent Application No. PCT/CN2018/089242, filed on May 31, 2018. The entire disclosure of the International Patent Application No. PCT/CN2018/089242 is incorporated by reference as part of the disclosure of this application.

TECHNICAL FIELD

The present disclosure relates to video coding techniques, devices and systems.

BACKGROUND

Motion compensation (MC) is a technique in video processing to predict a frame in a video, given the previous and/or future frames by accounting for motion of the camera and/or objects in the video. Motion compensation can be used in the encoding of video data for video compression.

SUMMARY

The present disclosure discloses methods, systems, and devices related to sub-block based motion prediction in video motion compensation.

In one representative aspect, a method for video processing is disclosed. The method includes partitioning a video block into a first set of sub-blocks according to a first pattern and partitioning the video block into a second set of sub-blocks according to a second pattern. At least one sub-block in the second set has a different dimension than a sub-block in the first set. The method also includes determining a prediction block that is a combination of a first intermediate prediction block generated from the first set of sub-blocks and a second intermediate prediction block generated from the second set of sub-blocks.

In another representative aspect, a method for video processing includes dividing a video block into multiple sub-blocks based on a dimension of the video block or a type of a coding algorithm associated with the video block. One sub-block of the multiple sub-blocks has a different dimension than other sub-blocks of the multiple sub-blocks. The method also includes generating motion vector predictions by applying the coding algorithm to the multiple sub-blocks and performing further processing of the video block using the motion vector predictions.

In another representative aspect, an apparatus comprising a processor is disclosed. The processor is configured to implement a method described in the present disclosure.

In yet another representative aspect, the various embodiments described herein may be embodied as a computer program product stored on a non-transitory computer readable media. The computer program product includes program code for carrying out the methods described herein.

In yet another representative aspect, a video decoder apparatus may implement a method as described herein.

The details of one or more implementations are set forth in the accompanying attachments, the drawings, and the description below. Other features will be apparent from the description and drawings, and from the claims.

BRIEF DESCRIPTION OF THE DRAWINGS

FIG. 14A shows an example dividing pattern in which block is divided into 4×4 sub-blocks in accordance with the disclosed embodiments.

FIG. 14B shows an example dividing pattern in which a block is divided into 8×8 sub-blocks in accordance with the disclosed embodiments.

FIG. 14C shows an example dividing pattern in which a block is divided into 4×8 sub-blocks in accordance with the disclosed embodiments.

FIG. 14D shows an example dividing pattern in which a block is divided into 8×4 sub-blocks in accordance with the disclosed embodiments.

FIG. 15B is another example flowchart of a method of video processing.

FIG. 19 is a block diagram of an example video processing system in which disclosed embodiments may be implemented.

DETAILED DESCRIPTION

Global motion compensation is one of variations of motion compensation techniques and can be used for predicting camera's motion. However, moving objects within a frame are not sufficiently represented by various implementations of the global motion compensation. Local motion estimation, such as block motion compensation, in which the frames are partitioned in blocks of pixels for performing the motion prediction, can be used to account for the objects moving within the frames.

Figure 1:
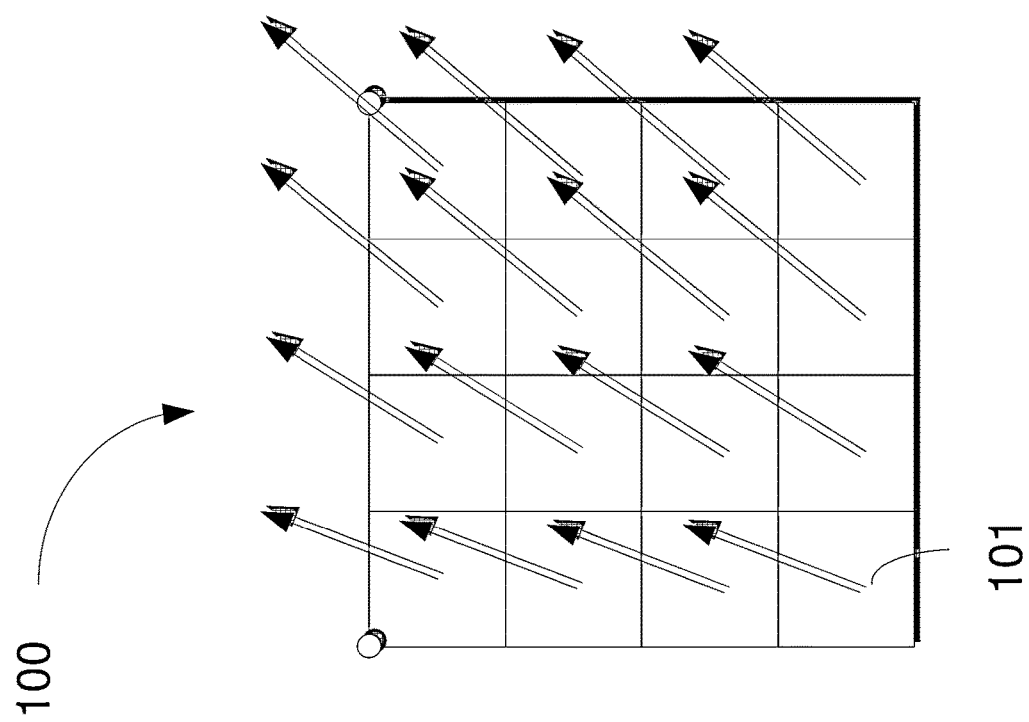
FIG. 1 is a schematic diagram showing an example of sub-block based prediction.

Sub-block based prediction, which was developed based on the block motion compensation, was first introduced into the video coding standard by High Efficiency Video Coding (HEVC) Annex I (3D-HEVC). FIG. 1 is a schematic diagram showing an example of sub-block based prediction. With sub-block based prediction, a block 100, such as a Coding Unit (CU) or a Prediction Unit (PU), is divided into several non-overlapped sub-blocks 101. Different sub-blocks may be assigned different motion information, such as reference index or Motion Vector (MV). Motion compensation is then performed individually for each sub-block.

To explore the future video coding technologies beyond HEVC, Joint Video Exploration Team (JVET) was founded jointly by the Video Coding Expert Group (VCEG) and the Moving Picture Expert Group (MPEG) in 2015. Many methods have been adopted by JVET and added into the reference software named Joint Exploration Model (JEM). In JEM, sub-block based prediction is adopted in several coding techniques, such as affine prediction, Alternative temporal motion vector prediction (ATMVP), spatial-temporal motion vector prediction (STMVP), Bi-directional Optical flow (BIO), and Frame-Rate Up Conversion (FRUC), which are discussed in detail below.

Affine Prediction

Figure 2:
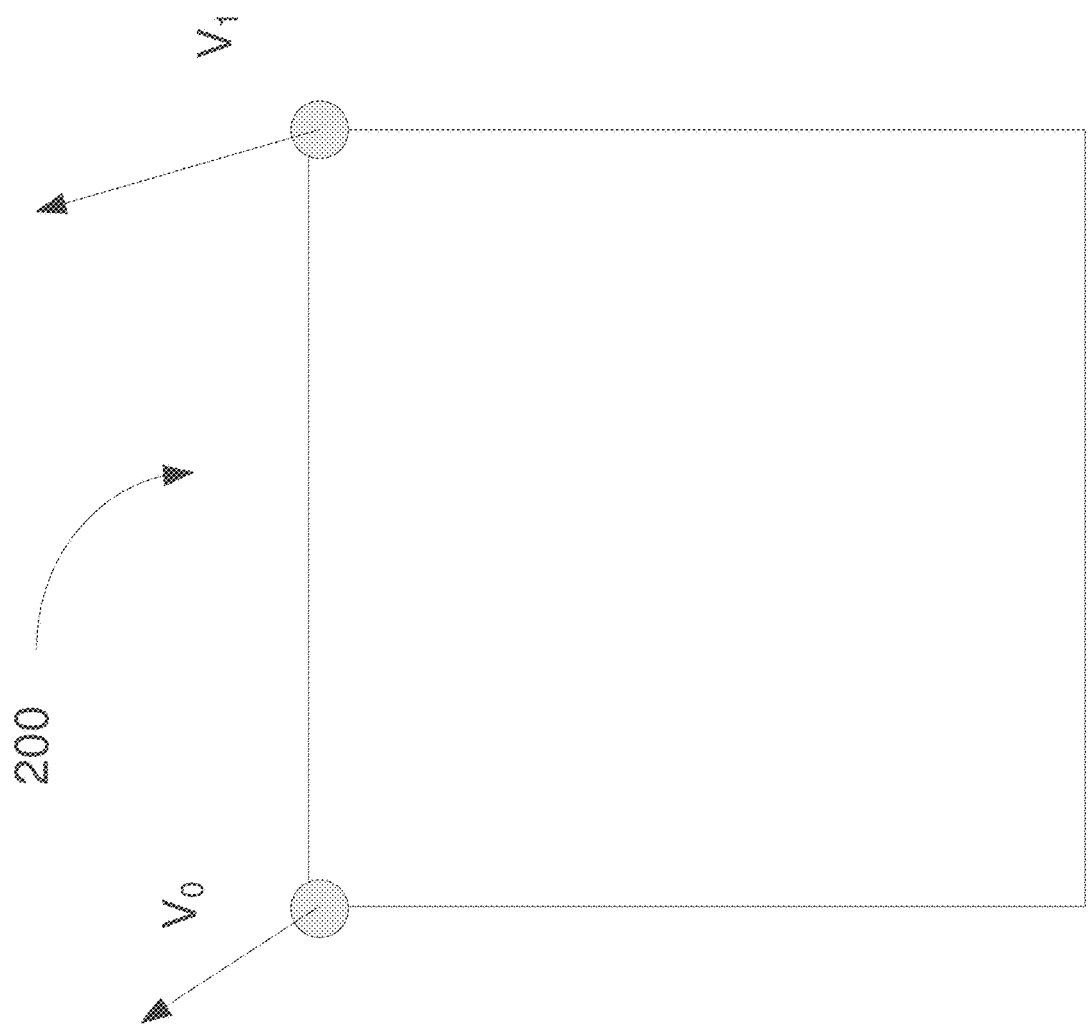
FIG. 2 shows an example of an affine motion field of a block described by two control point motion vectors.

In HEVC, only translation motion model is applied for motion compensation prediction (MCP). However, the camera and objects may have many kinds of motion, e.g., zoom in/out, rotation, perspective motions, and/or other irregular motions. JEM, on the other hand, applies a simplified affine transform motion compensation prediction. FIG. 2 shows an example of an affine motion field of a block 200 described by two control point motion vectors $V_0$ and $V_1$. The motion vector field (MVF) of the block 200 can be described by the following equation:

$$\begin{cases} v_x = \frac{(v_{1x} - v_{0x})}{w}x - \frac{(v_{1y} - v_{0y})}{w}y + v_{0x} \\ v_y = \frac{(v_{1y} - v_{0y})}{w}x - \frac{(v_{1x} - v_{0x})}{w}y + v_{0y} \end{cases} \quad \text{Eq. (1)}$$

As shown in FIG. 2, $(v_{0x}, v_{0y})$ is motion vector of the top-left corner control point, and $(v_{1x}, v_{1y})$ is motion vector of the top-right corner control point. To simplify the motion compensation prediction, sub-block based affine transform prediction can be applied. The sub-block size M×N is derived as follows:

$$\begin{cases} M = clip3\left(4, w, \frac{w \times MvPre}{\max(abs(v_{1x} - v_{0x}), abs(v_{1y} - v_{0y}))}\right) \\ N = clip3\left(4, h, \frac{h \times MvPre}{\max(abs(v_{2x} - v_{0x}), abs(v_{2y} - v_{0y}))}\right) \end{cases} \quad \text{Eq. (2)}$$

Here, MvPre is the motion vector fraction accuracy (e.g., 1/16 in JEM). $(v_{2x}, v_{2y})$ is motion vector of the bottom-left control point, calculated according to Eq. (1). M and N can be adjusted downward if necessary to make it a divisor of w and h, respectively.

Figure 3:
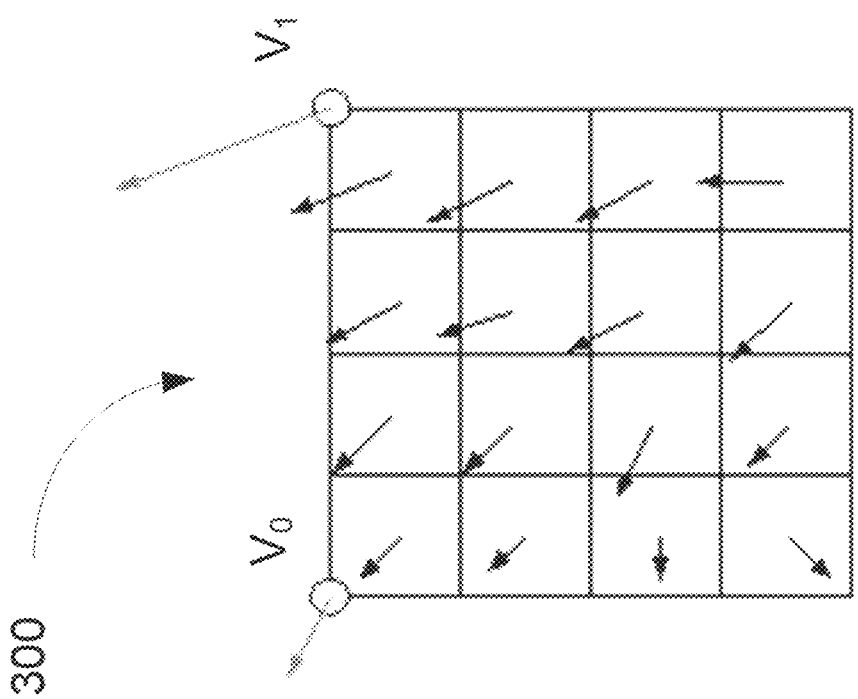
FIG. 3 shows an example of affine motion vector field per sub-block for a block.

FIG. 3 shows an example of affine MVF per sub-block for a block 300. To derive motion vector of each M×N sub-block, the motion vector of the center sample of each sub-block can be calculated according to Eq. (1), and rounded to the motion vector fraction accuracy (e.g., 1/16 in JEM). Then the motion compensation interpolation filters can be applied to generate the prediction of each sub-block with derived motion vector. After the MCP, the high accuracy motion vector of each sub-block is rounded and saved as the same accuracy as the normal motion vector.

Figure 4:
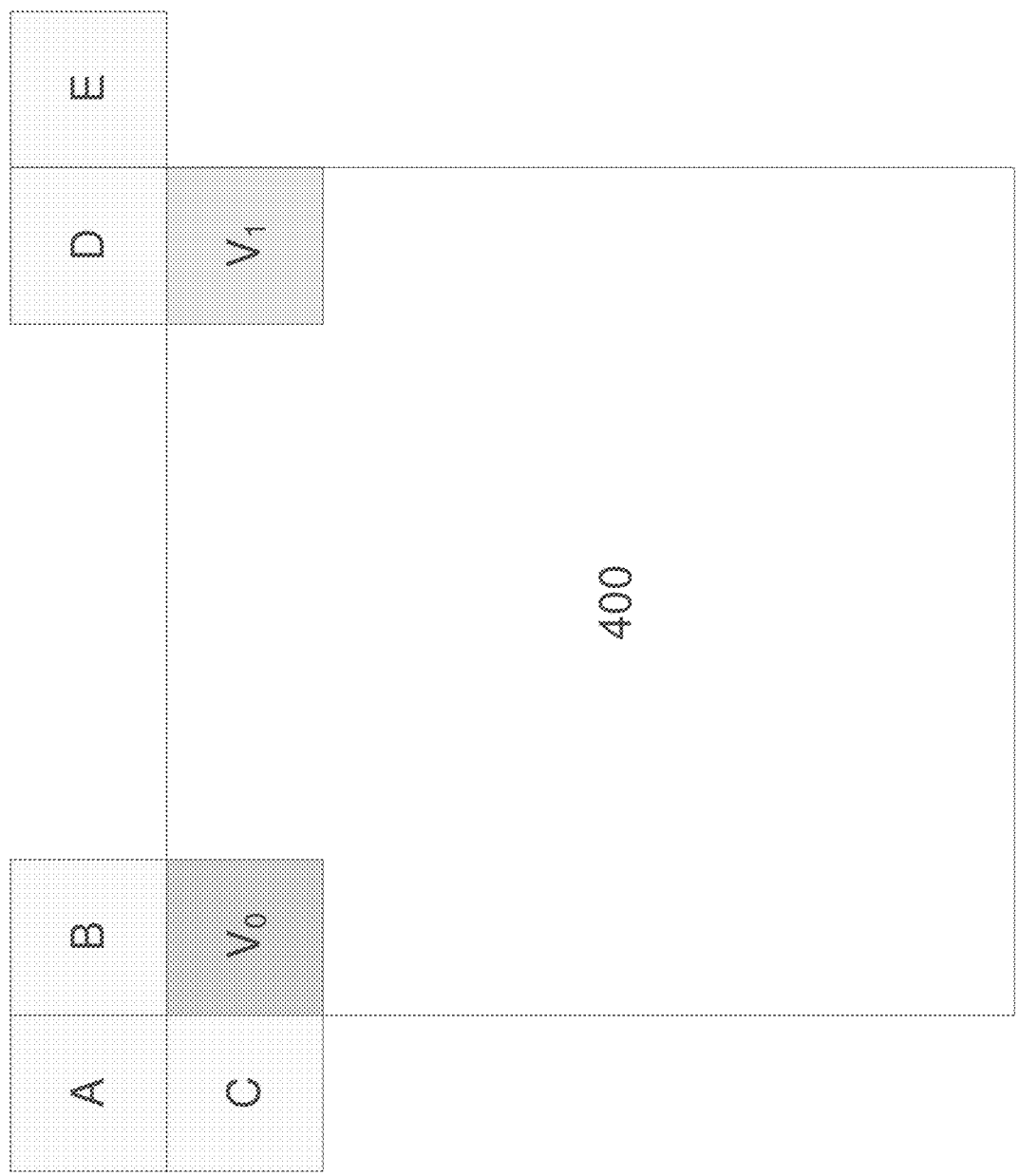
FIG. 4 shows an example of motion vector prediction for a block 400 in the AF_INTER mode.

In the JEM, there are two affine motion modes: AF_INTER mode and AF_MERGE mode. For CUs with both width and height larger than 8, AF_INTER mode can be applied. An affine flag in CU level is signaled in the bitstream to indicate whether AF_INTER mode is used. In the AF_INTER mode, a candidate list with motion vector pair $\{(v_0, v_1)|v_0=\{v_A, v_B, v_C\}, v_1=\{v_D, v_E\}\}$ is constructed using the neighboring blocks. FIG. 4 shows an example of motion vector prediction (MVP) for a block 400 in the AF_INTER mode. As shown in FIG. 4, $v_0$ is selected from the motion vectors of the sub-block A, B, or C. The motion vectors from the neighboring blocks can be scaled according to the reference list. The motion vectors can also be scaled according to the relationship among the Picture Order Count (POC) of the reference for the neighboring block, the POC of the reference for the current CU, and the POC of the current CU. The approach to select $v_1$ from the neighboring sub-block D and E is similar. If the number of candidate list is smaller than 2, the list is padded by the motion vector pair composed by duplicating each of the AMVP candidates. When the candidate list is larger than 2, the candidates can first be sorted according to the neighboring motion vectors (e.g., based on the similarity of the two motion vectors in a pair candidate). In some implementations, the first two candidates are kept. In some embodiments, a Rate Distortion (RD) cost check is used to determine which motion vector pair candidate is selected as the control point motion vector prediction (CPMVP) of the current CU. An index indicating the position of the CPMVP in the candidate list can be signaled in the bitstream. After the CPMVP of the current affine CU is determined, affine motion estimation is applied and the control point motion vector (CPMV) is found. Then the difference of the CPMV and the CPMVP is signaled in the bitstream.

Figure 5:
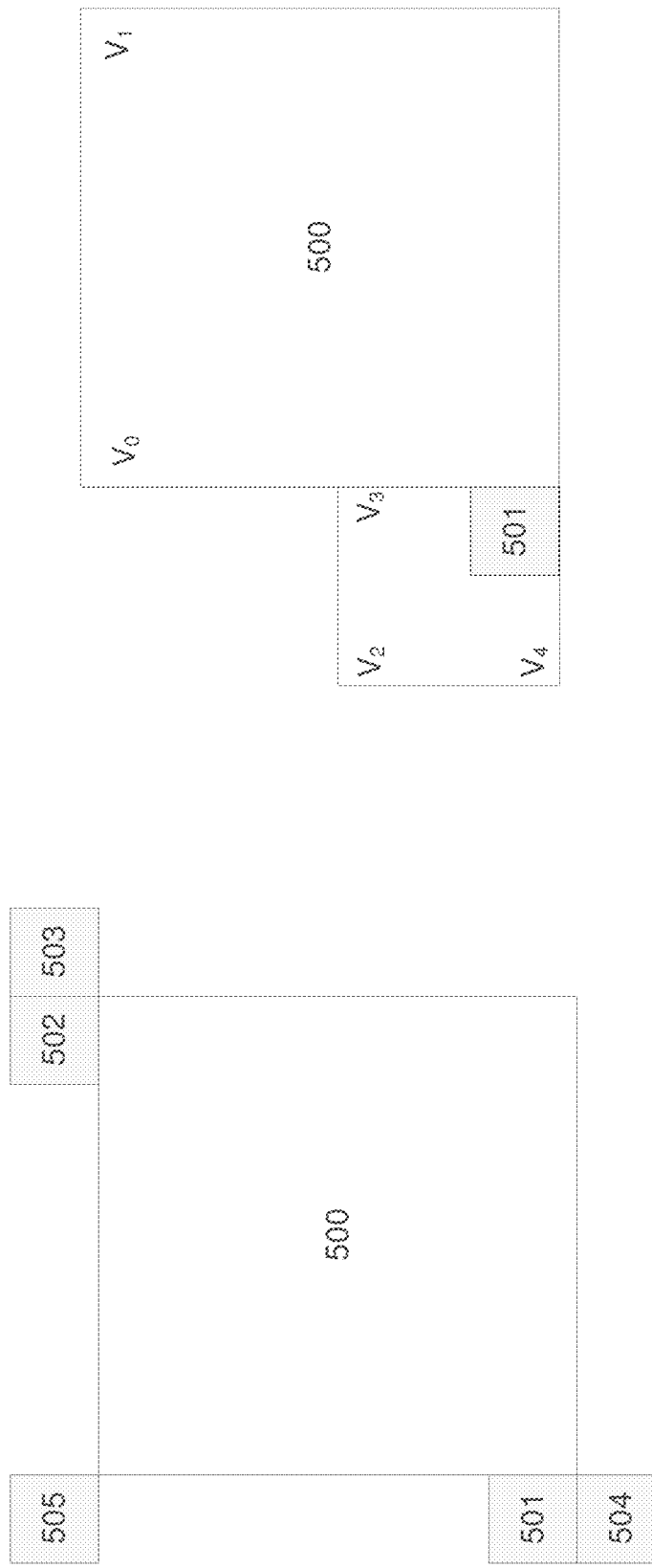
FIG. 5A shows an example of the selection order of candidate blocks for a current Coding Unit (CU).
FIG. 5B shows another example of candidate blocks for a current CU in the AF_MERGE mode.

When a CU is applied in AF_MERGE mode, it gets the first block coded with an affine mode from the valid neighboring reconstructed blocks. FIG. 5A shows an example of the selection order of candidate blocks for a current CU 500. As shown in FIG. 5A, the selection order can be from left (501), above (502), above right (503), left bottom (504) to above left (505) of the current CU 500. FIG. 5B shows another example of candidate blocks for a current CU 500 in the AF_MERGE mode. If the neighboring left bottom block 501 is coded in affine mode, as shown in FIG. 5B, the motion vectors $v_2$, $v_3$ and $v_4$ of the top left corner, above right corner, and left bottom corner of the CU containing the sub-block 501 are derived. The motion vector $v_0$ of the top left corner on the current CU 500 is calculated based on v2, v3 and v4. The motion vector v1 of the above right of the current CU can be calculated accordingly.

After the CPMV of the current CU v0 and v1 are computed according to the affine motion model in Eq. (1), the MVF of the current CU can be generated. In order to identify whether the current CU is coded with AF_MERGE mode, an affine flag can be signaled in the bitstream when there is at least one neighboring block is coded in affine mode.

Alternative Temporal Motion Vector Prediction (ATMVP)

In the ATMVP method, the temporal motion vector prediction (TMVP) method is modified by fetching multiple sets of motion information (including motion vectors and reference indices) from blocks smaller than the current CU.

Figure 6:
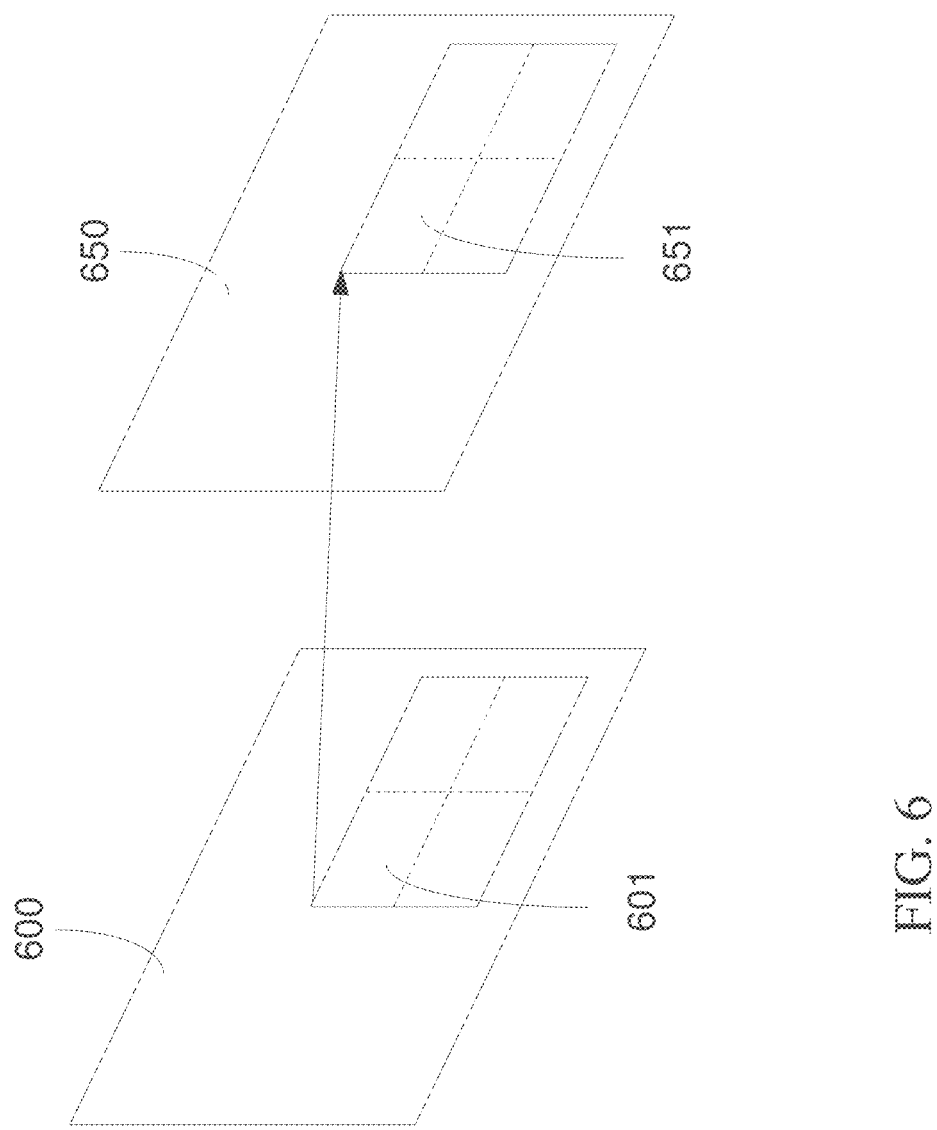
FIG. 6 shows an example of Alternative Temporal Motion Vector Prediction (ATMVP) motion prediction process for a CU.

FIG. 6 shows an example of ATMVP motion prediction process for a CU 600. The ATMVP method predicts the motion vectors of the sub-CUs 601 within a CU 600 in two steps. The first step is to identify the corresponding block 651 in a reference picture 650 with a temporal vector. The reference picture 650 is also referred to as the motion source picture. The second step is to split the current CU 600 into sub-CUs 601 and obtain the motion vectors as well as the reference indices of each sub-CU from the block corresponding to each sub-CU.

In the first step, a reference picture 650 and the corresponding block is determined by the motion information of the spatial neighboring blocks of the current CU 600. To avoid the repetitive scanning process of neighboring blocks, the first merge candidate in the merge candidate list of the current CU 600 is used. The first available motion vector as well as its associated reference index are set to be the temporal vector and the index to the motion source picture. This way, the corresponding block may be more accurately identified, compared with TMVP, in which the corresponding block (sometimes called collocated block) is always in a bottom-right or center position relative to the current CU.

In the second step, a corresponding block of the sub-CU 651 is identified by the temporal vector in the motion source picture 650, by adding to the coordinate of the current CU the temporal vector. For each sub-CU, the motion information of its corresponding block (e.g., the smallest motion grid that covers the center sample) is used to derive the motion information for the sub-CU. After the motion information of a corresponding N×N block is identified, it is converted to the motion vectors and reference indices of the current sub-CU, in the same way as TMVP of HEVC, wherein motion scaling and other procedures apply. For example, the decoder checks whether the low-delay condition (e.g., the POCs of all reference pictures of the current picture are smaller than the POC of the current picture) is fulfilled and possibly uses motion vector MVx (e.g., the motion vector corresponding to reference picture list X) to predict motion vector MVy (e.g., with X being equal to 0 or 1 and Y being equal to 1−X) for each sub-CU.

Spatial Temporal Motion Vector Prediction (STMVP)

Figure 7:
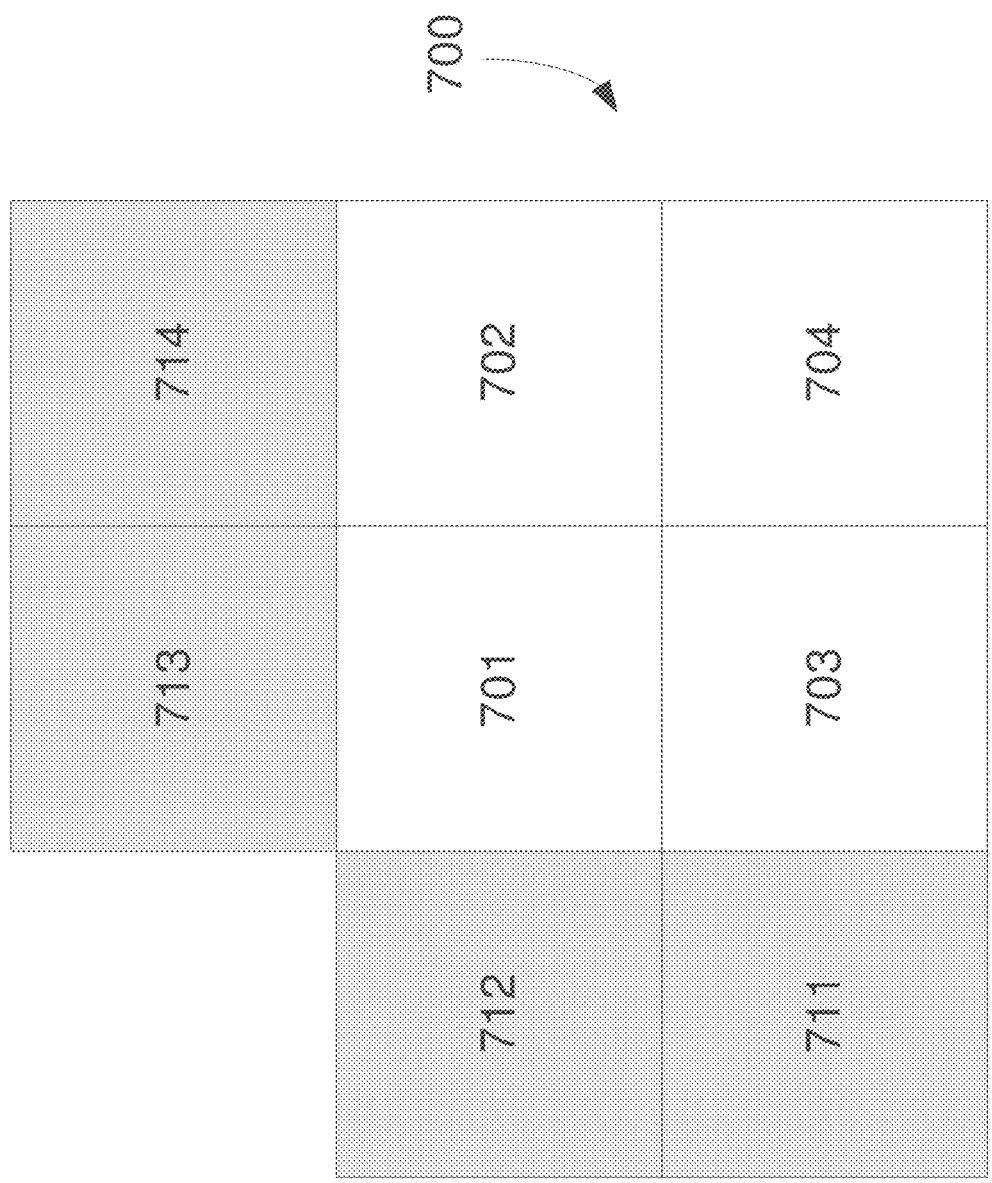
FIG. 7 shows an example of one CU with four sub-blocks and neighboring blocks.

In the STMVP method, the motion vectors of the sub-CUs are derived recursively, following raster scan order. FIG. 7 shows an example of one CU with four sub-blocks and neighboring blocks. Consider an 8×8 CU 700 that includes four 4×4 sub-CUs A (701), B (702), C (703), and D (704). The neighboring 4×4 blocks in the current frame are labelled as a (711), b (712), c (713), and d (714).

The motion derivation for sub-CU A starts by identifying its two spatial neighbors. The first neighbor is the N×N block above sub-CU A 701 (block c 713). If this block c (713) is not available or is intra coded the other N×N blocks above sub-CU A (701) are checked (from left to right, starting at block c 713). The second neighbor is a block to the left of the sub-CU A 701 (block b 712). If block b (712) is not available or is intra coded other blocks to the left of sub-CU A 701 are checked (from top to bottom, staring at block b 712). The motion information obtained from the neighboring blocks for each list is scaled to the first reference frame for a given list. Next, temporal motion vector predictor (TMVP) of sub-block A 701 is derived by following the same procedure of TMVP derivation as specified in HEVC. The motion information of the collocated block at block D 704 is fetched and scaled accordingly. Finally, after retrieving and scaling the motion information, all available motion vectors are averaged separately for each reference list. The averaged motion vector is assigned as the motion vector of the current sub-CU.

Bi-Directional Optical Flow (BIO)

The Bi-directional Optical flow (BIO) method is sample-wise motion refinement performed on top of block-wise motion compensation for bi-prediction. In some implementations, the sample-level motion refinement does not use signaling.

Let $I^{(k)}$ be the luma value from reference k (k=0, 1) after block motion compensation, and $\partial I^{(k)}/\partial x$, $\partial I^{(k)}/\partial y$ are horizontal and vertical components of the $I^{(k)}$ gradient, respectively. Assuming the optical flow is valid, the motion vector field $(v_x, v_y)$ is given by:

$$\partial I^{(k)}/\partial t + v_x \partial I^{(k)}/\partial x + v_y \partial I^{(k)}/\partial y = 0. \qquad \text{Eq. (3)}$$

Combining this optical flow equation with Hermite interpolation for the motion trajectory of each sample results in a unique third-order polynomial that matches both the function values $I^{(k)}$ and derivatives $\partial I^{(k)}/\partial x$, $\partial I^{(k)}/\partial y$ at the ends. The value of this polynomial at t=0 is the BIO prediction:

$$\text{pred}_{BIO} = \tfrac{1}{2} \cdot (I^{(0)} + I^{(1)} + v_x/2 \cdot (\tau_1 \partial I^{(1)}/\partial x - \tau_0 \partial I^{(0)}/\partial x) + v_y/2 \cdot (\tau_1 \partial I^{(1)}/\partial y - \tau_0 \partial I^{(0)}/\partial y)). \qquad \text{Eq. (4)}$$

Figure 8:
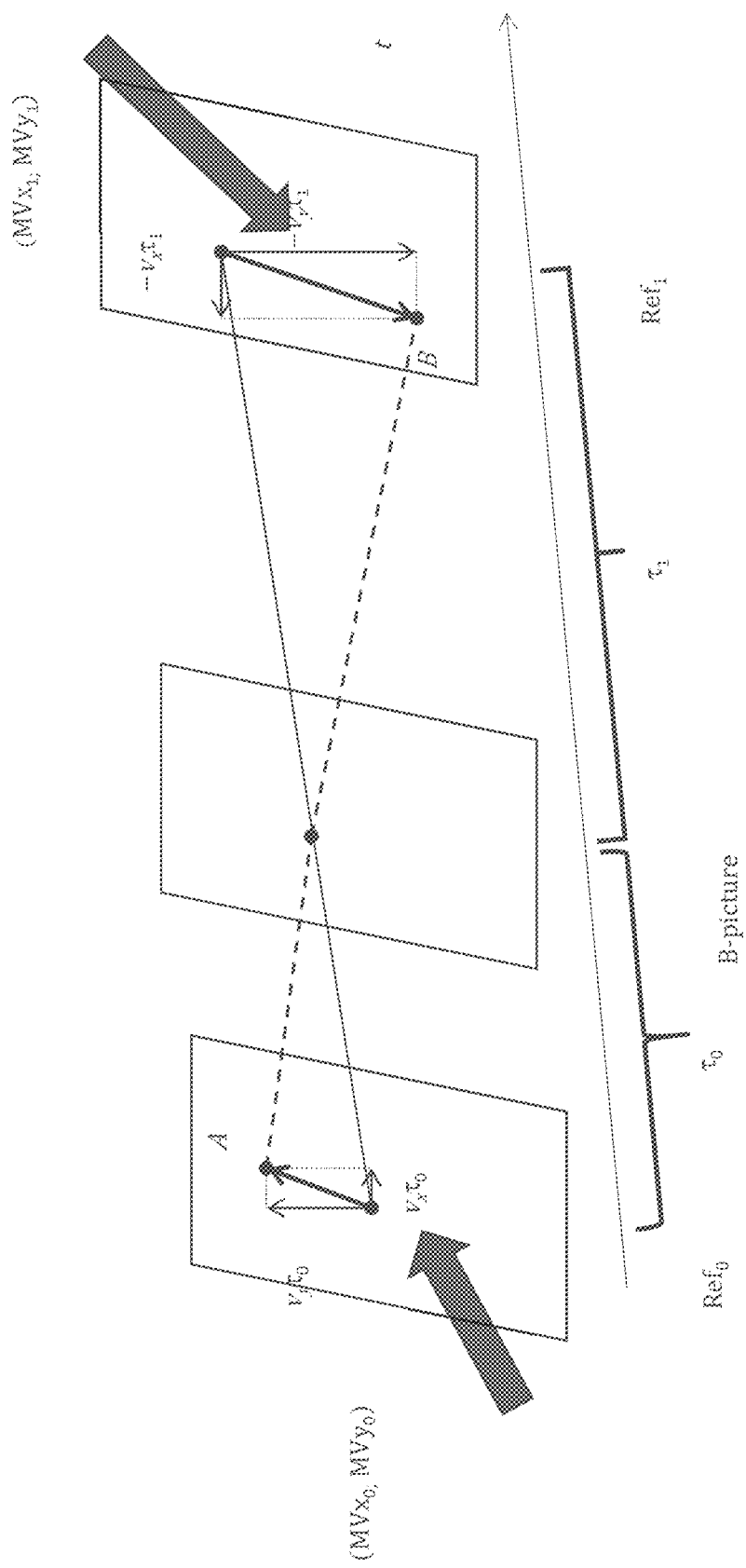
FIG. 8 shows an example optical flow trajectory in the Bi-directional Optical flow (BIO) method.

FIG. 8 shows an example optical flow trajectory in the Bi-directional Optical flow (BIO) method. Here, $\tau_0$ and $\tau_1$ denote the distances to the reference frames. Distances $\tau_0$ and $\tau_1$ are calculated based on POC for $\text{Ref}_0$ and $\text{Ref}_1$: $\tau_0 = \text{POC}(\text{current}) - \text{POC}(\text{Ref}_0)$, $\tau_1 = \text{POC}(\text{Ref}_1) - \text{POC}(\text{current})$. If both predictions come from the same time direction (either both from the past or both from the future) then the signs are different (e.g., $\tau_0 \cdot \tau_1 < 0$). In this case, BIO is applied if the prediction is not from the same time moment (e.g., $\tau_0 \neq \tau_1$). Both referenced regions have non-zero motion (e.g., $MVx_0, MVy_0, MVx_1, MVy_1 \neq 0$) and the block motion vectors are proportional to the time distance (e.g., $MVx_0/MVx_1 = MVy_0/MVy_1 = -\tau_0/\tau_1$).

Figure 9B:
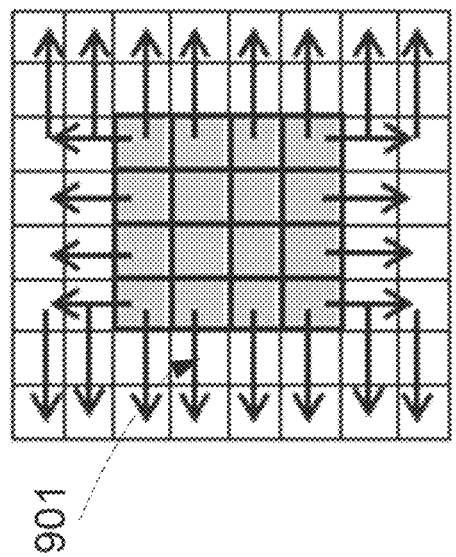
FIG. 9B shows that a padding area can used to avoid extra memory access and calculation.
Figure 9A:
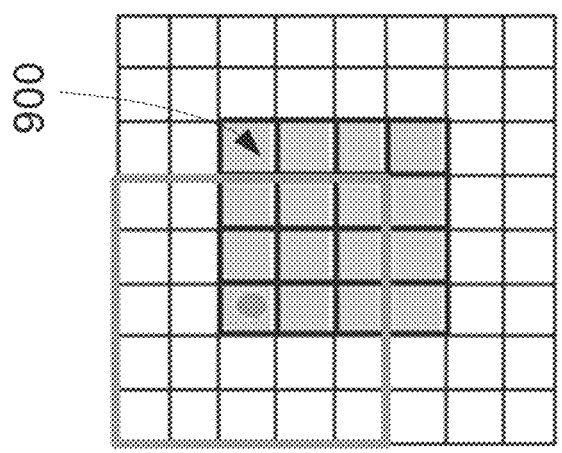
FIG. 9A shows an example of access positions outside of a block.

The motion vector field $(v_x, v_y)$ is determined by minimizing the difference $\Delta$ between values in points A and B. FIGS. 9A-9B show an example of intersection of motion trajectory and reference frame planes. Model uses only first linear term of a local Taylor expansion for $\Delta$:

$$\Delta = (I^{(0)} + I^{(1)} + v_x(\tau_1 \partial I^{(1)}/\partial x - \tau_0 \partial I^{(0)}/\partial x) + v_y(\tau_1 \partial I^{(1)}/\partial y - \tau_0 \partial I^{(0)}/\partial y)). \qquad \text{Eq. (5)}$$

All values in the above equation depend on the sample location, denoted as (i', j'). Assuming the motion is consistent in the local surrounding area, $\Delta$ can be minimized inside the (2M+1)×(2M+1) square window $\Omega$ centered on the currently predicted point (i, j), where M is equal to 2:

$$(v_x, v_y) = \operatorname*{argmin}_{v_x, v_y} \sum_{[i', j'] \in \Omega} \Delta^2[i', j'] \qquad \text{Eq. (6)}$$

For this optimization problem, the JEM uses a simplified approach making first a minimization in the vertical direction and then in the horizontal direction. This results in the following:

$$v_x = (s_1 + r) > m ? clip3\left(-thBIO, thBIO, -\frac{s_3}{(s_1 + r)}\right) : 0 \quad \text{Eq. (7)}$$

$$v_y = (s_5 + r) > m ? clip3\left(-thBIO, thBIO, -\frac{s_6 - v_x s_2/2}{(s_5 + r)}\right) : 0 \quad \text{Eq. (8)}$$

Where,
$$s_1 = \sum_{[i',j] \in \Omega} \left(\tau_1 \partial I^{(1)}/\partial x + \tau_0 \partial I^{(0)}/\partial x\right)^2;$$

$$s_3 = \sum_{[i',j] \in \Omega} \left(I^{(1)} - I^{(0)}\right)\left(\tau_1 \partial I^{(1)}/\partial x + \tau_0 \partial I^{(0)}/\partial x\right);$$

$$s_2 = \sum_{[i',j] \in \Omega} \left(\tau_1 \partial I^{(1)}/\partial x + \tau_0 \partial I^{(0)}/\partial x\right)\left(\tau_1 \partial I^{(1)}/\partial y + \tau_0 \partial I^{(0)}/\partial y\right);$$

$$s_5 = \sum_{[i',j] \in \Omega} \left(\tau_1 \partial I^{(1)}/\partial y + \tau_0 \partial I^{(0)}/\partial y\right)^2;$$

$$s_6 = \sum_{[i',j] \in \Omega} \left(I^{(1)} - I^{(0)}\right)\left(\tau_1 \partial I^{(1)}/\partial y + \tau_0 \partial I^{(0)}/\partial y\right);$$

Eq. (9)

In order to avoid division by zero or a very small value, regularization parameters r and m can be introduced in Eq. (7) and Eq. (8).

$$r = 500 \cdot 4^{d-8} \quad \text{Eq. (10)}$$

$$m = 700 \cdot 4^{d-8} \quad \text{Eq. (11)}$$

Here, d is a bit depth of the video samples.

In order to keep the memory access for BIO the same as for regular bi-predictive motion compensation, all prediction and gradients values, $I^{(k)}$, $\partial I^{(k)}/\partial x$, $\partial I^{(k)}/\partial y$, are calculated for positions inside the current block. FIG. 9A shows an example of access positions outside of a block 900. As shown in FIG. 9A, in Eq. (9), (2M+1)×(2M+1) square window $\Omega$ centered in currently predicted point on a boundary of predicted block needs to accesses positions outside of the block. In the JEM, values of $I^{(k)}$, $\partial I^{(k)}/\partial x$, $\partial I^{(k)}/\partial y$ outside of the block are set to be equal to the nearest available value inside the block. For example, this can be implemented as a padding area 901, as shown in FIG. 9B.

With BIO, it is possible that the motion field can be refined for each sample. To reduce the computational complexity, a block-based design of BIO is used in the JEM. The motion refinement can be calculated based on a 4×4 block. In the block-based BIO, the values of $s_n$ in Eq. (9) of all samples in a 4×4 block can be aggregated, and then the aggregated values of $s_n$ in are used to derived BIO motion vectors offset for the 4×4 block. More specifically, the following formula can used for block-based BIO derivation:

$$s_{1,b_k} = \sum_{(x,y) \in b_k} \sum_{[i',j] \in \Omega} \left(\tau_1 \partial I^{(1)}/\partial x + \tau_0 \partial I^{(0)}/\partial x\right)^2;$$

$$s_{3,b_k} = \sum_{(x,y) \in b_k} \sum_{[i',j] \in \Omega} \left(I^{(1)} - I^{(0)}\right)\left(\tau_1 \partial I^{(1)}/\partial x + \tau_0 \partial I^{(0)}/\partial x\right);$$

$$s_{2,b_k} = \sum_{(x,y) \in b_k} \sum_{[i',j] \in \Omega} \left(\tau_1 \partial I^{(1)}/\partial x + \tau_0 \partial I^{(0)}/\partial x\right)\left(\tau_1 \partial I^{(1)}/\partial y + \tau_0 \partial I^{(0)}/\partial y\right);$$

$$s_{5,b_k} = \sum_{(x,y) \in b_k} \sum_{[i',j] \in \Omega} \left(\tau_1 \partial I^{(1)}/\partial y + \tau_0 \partial I^{(0)}/\partial y\right)^2;$$

$$s_{6,b_k} = \sum_{(x,y) \in b_k} \sum_{[i',j] \in \Omega} \left(I^{(1)} - I^{(0)}\right)\left(\tau_1 \partial I^{(1)}/\partial y + \tau_0 \partial I^{(0)}/\partial y\right);$$

Here, $b_k$ denotes the set of samples belonging to the k-th 4×4 block of the predicted block. $s_n$ in Eq (7) and Eq (8) are replaced by $((s_{n,b_k}) >>> 4)$ to derive the associated motion vector offsets.

Eq. (12)

In some scenarios, MV regiment of BIO may be unreliable due to noise or irregular motion. Therefore, in BIO, the magnitude of MV regiment is clipped to a threshold value. The threshold value is determined based on whether the reference pictures of the current picture are all from one direction. For example, if all the reference pictures of the current picture are from one direction, the value of the threshold is set to $12 \times 2^{14-d}$; otherwise, it is set to $12 \times 2^{13-d}$.

Gradients for BIO can be calculated at the same time with motion compensation interpolation using operations consistent with HEVC motion compensation process (e.g., two-dimensional (2D) separable Finite Impulse Response (FIR)). In some embodiments, the input for the 2D separable FIR is the same reference frame sample as for motion compensation process and fractional position (fracX, fracY) according to the fractional part of block motion vector. For horizontal gradient $\partial I/\partial x$, a signal is first interpolated vertically using BIOfilterS corresponding to the fractional position fracY with de-scaling shift d−8. Gradient filter BIOfilterG is then applied in horizontal direction corresponding to the fractional position fracX with de-scaling shift by 18−d. For vertical gradient allay, a gradient filter is applied vertically using BIOfilterG corresponding to the fractional position fracY with de-scaling shift d−8. The signal displacement is then performed using BIOfilterS in horizontal direction corresponding to the fractional position fracX with de-scaling shift by 18−d. The length of interpolation filter for gradients calculation BIOfilterG and signal displacement BIOfilterF can be shorter (e.g., 6-tap) in order to maintain reasonable complexity. Table 1 shows example filters that can be used for gradients calculation of different fractional positions of block motion vector in BIO. Table 2 shows example interpolation filters that can be used for prediction signal generation in BIO.

TABLE 1

Example filters for gradient calculation in BIO

| Fractional pel position | Interpolation filter for gradient(BIOfilterG) |
|---|---|
| 0 | {8, −39, −3, 46, −17, 5} |
| 1/16 | {8, −32, −13, 50, −18, 5} |
| 1/8 | {7, −27, −20, 54, −19, 5} |
| 3/16 | {6, −21, −29, 57, −18, 5} |
| 1/4 | {4, −17, −36, 60, −15, 4} |
| 5/16 | {3, −9, −44, 61, −15, 4} |
| 3/8 | {1, −4, −48, 61, −13, 3} |
| 7/16 | {0, 1, −54, 60, −9, 2} |
| 1/2 | {−1, 4, −57, 57, −4, 1} |

TABLE 2

Example interpolation filters for prediction signal generation in BIO

| Fractional pel position | Interpolation filter for prediction signal(BIOfilterS) |
|---|---|
| 0 | {0, 0, 64, 0, 0, 0} |
| 1/16 | {1, −3, 64, 4, −2, 0} |
| 1/8 | {1, −6, 62, 9, −3, 1} |
| 3/16 | {2, −8, 60, 14, −5, 1} |
| 1/4 | {2, −9, 57, 19, −7, 2} |
| 5/16 | {3, −10, 53, 24, −8, 2} |
| 3/8 | {3, −11, 50, 29, −9, 2} |
| 7/16 | {3, −11, 44, 35, −10, 3} |
| 1/2 | {3, −10, 35, 44, −11, 3} |

In the JEM, BIO can be applied to all bi-predicted blocks when the two predictions are from different reference pictures. When Local Illumination Compensation (LIC) is enabled for a CU, BIO can be disabled.

In some embodiments, Overlapped Block Motion Compensation (OBMC) is applied for a block after normal MC process. To reduce the computational complexity, BIO may not be applied during the OBMC process. This means that BIO is applied in the MC process for a block when using its own MV and is not applied in the MC process when the MV of a neighboring block is used during the OBMC process.

Frame-Rate Up Conversion (FRUC)

A FRUC flag can be signaled for a CU when its merge flag is true. When the FRUC flag is false, a merge index can be signaled and the regular merge mode is used. When the FRUC flag is true, an additional FRUC mode flag can be signaled to indicate which method (e.g., bilateral matching or template matching) is to be used to derive motion information for the block.

At encoder side, the decision on whether using FRUC merge mode for a CU is based on RD cost selection as done for normal merge candidate. For example, multiple matching modes (e.g., bilateral matching and template matching) are checked for a CU by using RD cost selection. The one leading to the minimal cost is further compared to other CU modes. If a FRUC matching mode is the most efficient one, FRUC flag is set to true for the CU and the related matching mode is used.

Typically, motion derivation process in FRUC merge mode has two steps: a CU-level motion search is first performed, then followed by a Sub-CU level motion refinement. At CU level, an initial motion vector is derived for the whole CU based on bilateral matching or template matching. First, a list of MV candidates is generated and the candidate that leads to the minimum matching cost is selected as the starting point for further CU level refinement. Then a local search based on bilateral matching or template matching around the starting point is performed. The MV results in the minimum matching cost is taken as the MV for the whole CU. Subsequently, the motion information is further refined at sub-CU level with the derived CU motion vectors as the starting points.

For example, the following derivation process is performed for a W×H CU motion information derivation. At the first stage, MV for the whole W×H CU is derived. At the second stage, the CU is further split into M×M sub-CUs. The value of M is calculated as in (16), D is a predefined splitting depth which is set to 3 by default in the JEM. Then the MV for each sub-CU is derived.

$$M = \max\left\{4, \min\left\{\frac{M}{2^D}, \frac{N}{2^D}\right\}\right\} \quad \text{Eq. (13)}$$

Figure 10:
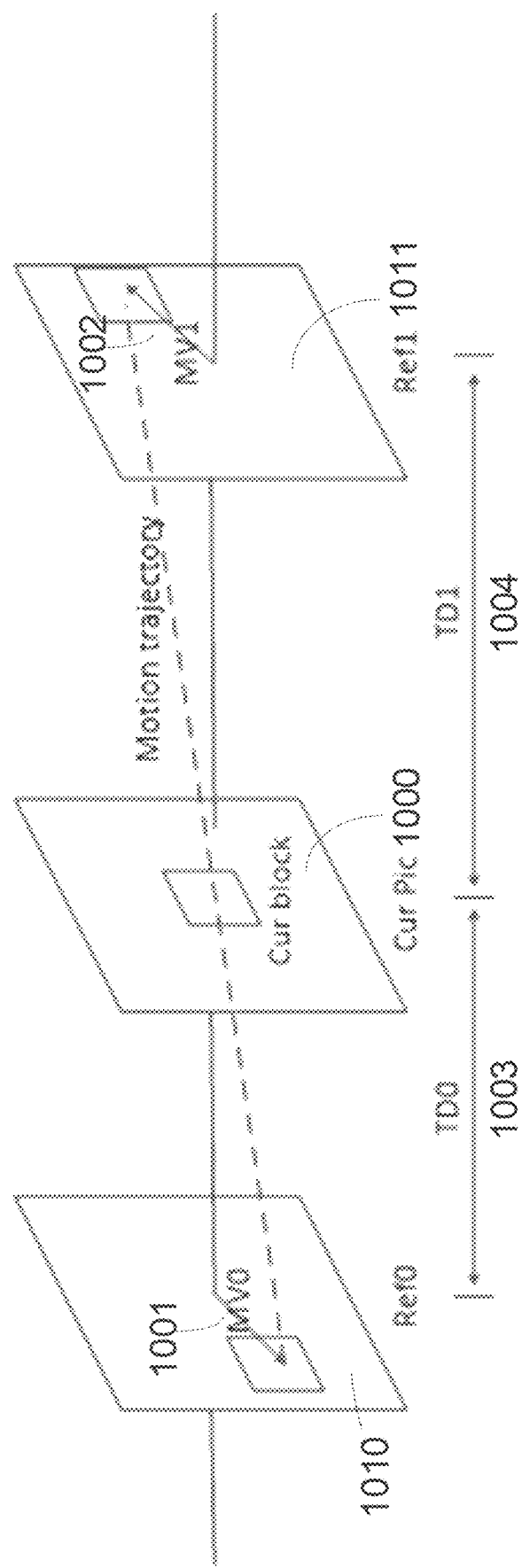
FIG. 10 shows an example of bilateral matching used in the Frame-Rate Up Conversion (FRUC) method.

FIG. 10 shows an example of bilateral matching used in the Frame-Rate Up Conversion (FRUC) method. The bilateral matching is used to derive motion information of the current CU by finding the closest match between two blocks along the motion trajectory of the current CU (1000) in two different reference pictures (1010, 1011). Under the assumption of continuous motion trajectory, the motion vectors MV0 (1001) and MV1 (1002) pointing to the two reference blocks are proportional to the temporal distances, e.g., TD0 (1003) and TD1 (1004), between the current picture and the two reference pictures. In some embodiments, when the current picture 1000 is temporally between the two reference pictures (1010, 1011) and the temporal distance from the current picture to the two reference pictures is the same, the bilateral matching becomes mirror based bi-directional MV.

Figure 11:
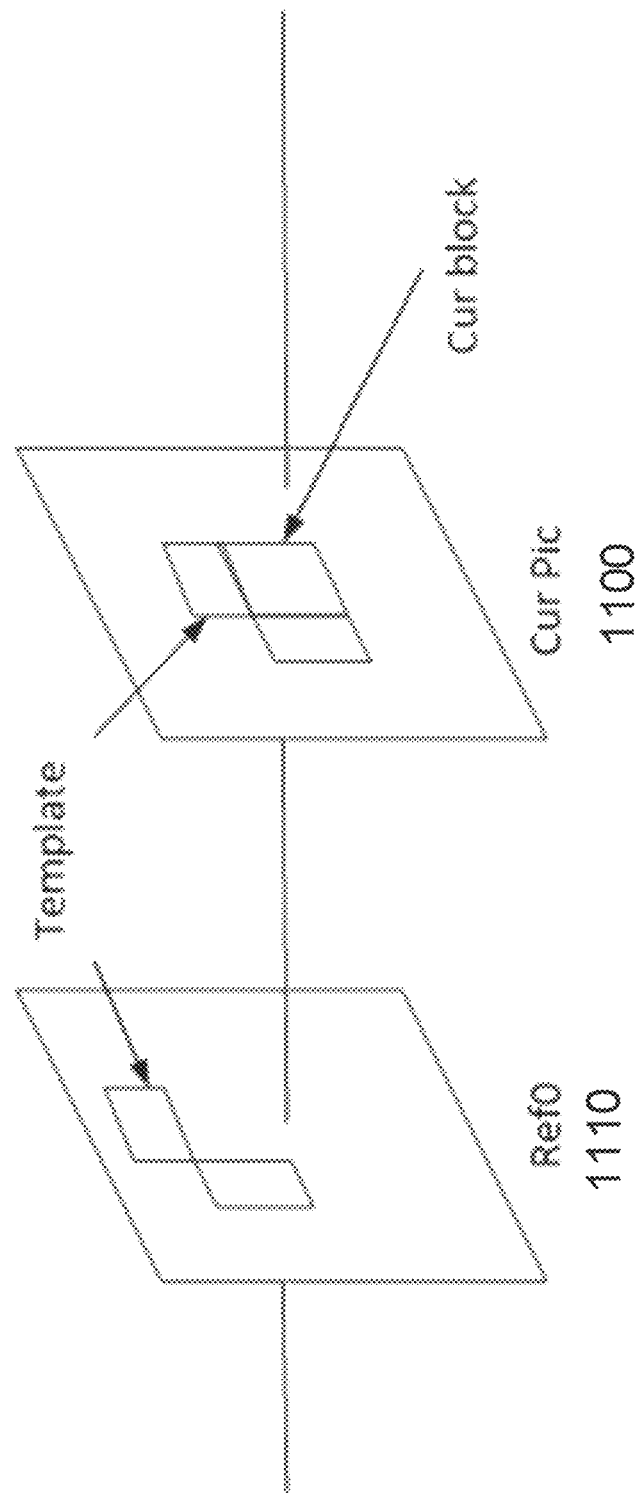
FIG. 11 shows an example of template matching used in the FRUC method.

FIG. 11 shows an example of template matching used in the FRUC method. Template matching can be used to derive motion information of the current CU 1100 by finding the closest match between a template (e.g., top and/or left neighboring blocks of the current CU) in the current picture and a block (e.g., same size to the template) in a reference picture 1110. Except the aforementioned FRUC merge mode, the template matching can also be applied to AMVP mode. In both JEM and HEVC, AMVP has two candidates. With the template matching method, a new candidate can be derived. If the newly derived candidate by template matching is different to the first existing AMVP candidate, it is inserted at the very beginning of the AMVP candidate list and then the list size is set to two (e.g., by removing the second existing AMVP candidate). When applied to AMVP mode, only CU level search is applied.

The MV candidate set at CU level can include the following: (1) original AMVP candidates if the current CU is in AMVP mode, (2) all merge candidates, (3) several MVs in the interpolated MV field (described later), and top and left neighboring motion vectors.

When using bilateral matching, each valid MV of a merge candidate can be used as an input to generate a MV pair with the assumption of bilateral matching. For example, one valid MV of a merge candidate is (MVa, $ref_a$) at reference list A. Then the reference picture $ref_b$ of its paired bilateral MV is found in the other reference list B so that $ref_a$ and $ref_b$ are temporally at different sides of the current picture. If such a ref$_b$ is not available in reference list B, ref$_b$ is determined as a reference which is different from ref$_a$ and its temporal distance to the current picture is the minimal one in list B. After ref$_b$ is determined, MVb is derived by scaling MVa based on the temporal distance between the current picture and ref$_a$, ref$_b$.

In some implementations, four MVs from the interpolated MV field can also be added to the CU level candidate list. More specifically, the interpolated MVs at the position (0, 0), (W/2, 0), (0, H/2) and (W/2, H/2) of the current CU are added. When FRUC is applied in AMVP mode, the original AMVP candidates are also added to CU level MV candidate set. In some implementations, at the CU level, 15 MVs for AMVP CUs and 13 MVs for merge CUs can be added to the candidate list.

The MV candidate set at sub-CU level includes an MV determined from a CU-level search, (2) top, left, top-left and top-right neighboring MVs, (3) scaled versions of collocated MVs from reference pictures, (4) one or more ATMVP candidates (e.g., up to four), and (5) one or more STMVP candidates (e.g., up to four). The scaled MVs from reference pictures are derived as follows. The reference pictures in both lists are traversed. The MVs at a collocated position of the sub-CU in a reference picture are scaled to the reference of the starting CU-level MV. ATMVP and STMVP candidates can be the four first ones. At the sub-CU level, one or more MVs (e.g., up to 17) are added to the candidate list.

Generation of Interpolated MV Field

Before coding a frame, interpolated motion field is generated for the whole picture based on unilateral ME. Then the motion field may be used later as CU level or sub-CU level MV candidates.

Figure 12:
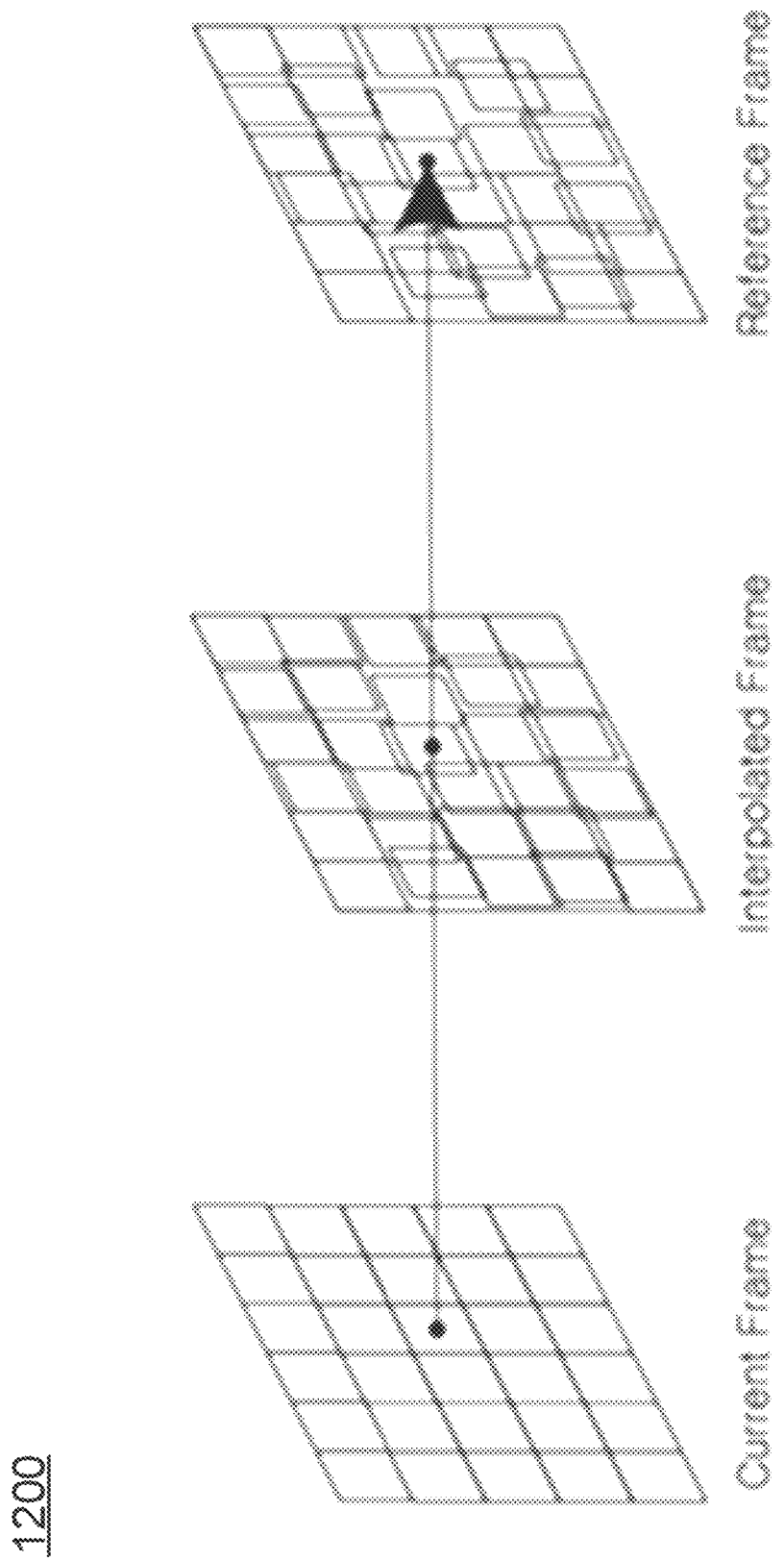
FIG. 12 shows an example of unilateral Motion Estimation (ME) in the FRUC method.

In some embodiments, the motion field of each reference pictures in both reference lists is traversed at 4×4 block level. FIG. 12 shows an example of unilateral Motion Estimation (ME) 1200 in the FRUC method. For each 4×4 block, if the motion associated to the block passing through a 4×4 block in the current picture and the block has not been assigned any interpolated motion, the motion of the reference block is scaled to the current picture according to the temporal distance TD0 and TD1 (the same way as that of MV scaling of TMVP in HEVC) and the scaled motion is assigned to the block in the current frame. If no scaled MV is assigned to a 4×4 block, the block's motion is marked as unavailable in the interpolated motion field.

Interpolation and Matching Cost

When a motion vector points to a fractional sample position, motion compensated interpolation is needed. To reduce complexity, bi-linear interpolation instead of regular 8-tap HEVC interpolation can be used for both bilateral matching and template matching.

The calculation of matching cost is a bit different at different steps. When selecting the candidate from the candidate set at the CU level, the matching cost can be the absolute sum difference (SAD) of bilateral matching or template matching. After the starting MV is determined, the matching cost C of bilateral matching at sub-CU level search is calculated as follows:

$$C = SAD + w \cdot (|MV_x - MV_x^s| + |MV_y - MV_y^s|) \qquad \text{Eq. (14)}$$

Here, w is a weighting factor. In some embodiments, w can be empirically set to 4. MV and MV$^s$ indicate the current MV and the starting MV, respectively. SAD may still be used as the matching cost of template matching at sub-CU level search.

In FRUC mode, MV is derived by using luma samples only. The derived motion will be used for both luma and chroma for MC inter prediction. After MV is decided, final MC is performed using 8-taps interpolation filter for luma and 4-taps interpolation filter for chroma.

MV refinement is a pattern based MV search with the criterion of bilateral matching cost or template matching cost. In the JEM, two search patterns are supported—an unrestricted center-biased diamond search (UCBDS) and an adaptive cross search for MV refinement at the CU level and sub-CU level, respectively. For both CU and sub-CU level MV refinement, the MV is directly searched at quarter luma sample MV accuracy, and this is followed by one-eighth luma sample MV refinement. The search range of MV refinement for the CU and sub-CU step are set equal to 8 luma samples.

In the bilateral matching merge mode, bi-prediction is applied because the motion information of a CU is derived based on the closest match between two blocks along the motion trajectory of the current CU in two different reference pictures. In the template matching merge mode, the encoder can choose among uni-prediction from list0, uni-prediction from list1, or bi-prediction for a CU. The selection can be based on a template matching cost as follows:

If costBi<=factor*min (cost0, cost1)
  bi-prediction is used;
Otherwise, if cost0<=cost1
  uni-prediction from list0 is used;
Otherwise,
  uni-prediction from list1 is used;

Here, cost0 is the SAD of list0 template matching, cost1 is the SAD of list1 template matching and costBi is the SAD of bi-prediction template matching. For example, when the value of factor is equal to 1.25, it means that the selection process is biased toward bi-prediction. The inter prediction direction selection can be applied to the CU-level template matching process.

The sub-block based prediction techniques discussed above can be used to obtain more accurate motion information of each sub-block when the size of sub-blocks is smaller. However, smaller sub-blocks impose a higher bandwidth requirement in motion compensation. On the other hand, motion information derived for smaller sub-block may not be accurate, especially when there are some noises in a block. Therefore, having a fixed sub-block size within one block may be suboptimal.

The present disclosure describes techniques that can be used in various embodiments to use non-uniform and/or variable sub-block sizes to address the bandwidth and accuracy problems that a fixed sub-block size introduces. The techniques, also referred to as interweaved prediction, use different ways of dividing a block so that motion information can be obtained more robustly without increasing bandwidth consumption.

Using the interweaved prediction techniques, a block is divided into sub-blocks with one or more dividing patterns. A dividing pattern represents the way to divide a block into sub-blocks, including the size of sub-blocks and the position of sub-blocks. For each dividing pattern, a corresponding prediction block may be generated by deriving motion information of each sub-block based on the dividing pattern. Therefore, in some embodiments, multiple prediction blocks may be generated by multiple dividing patterns even for one prediction direction. In some embodiments, for each prediction direction, only one dividing pattern may be applied.

Figure 13:
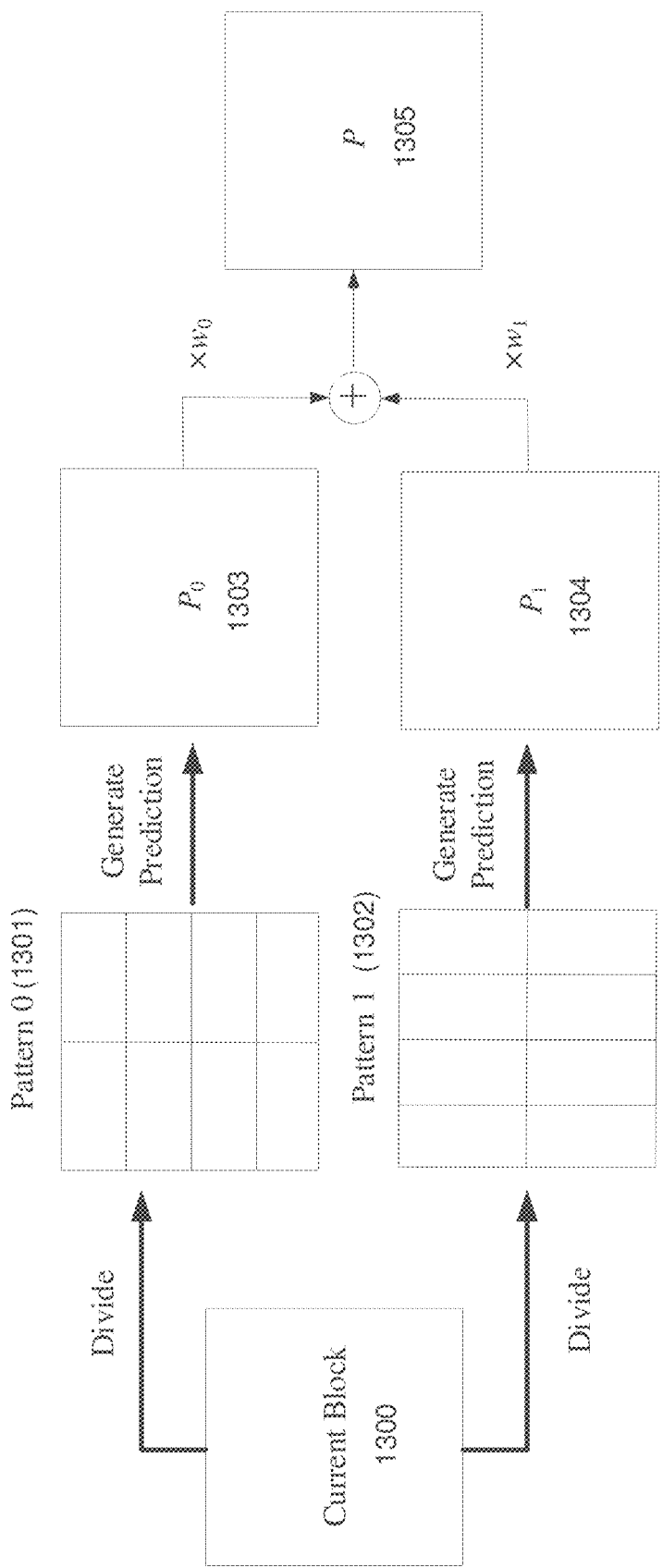
FIG. 13 shows an example of interweaved prediction with two dividing patterns in accordance with the disclosed embodiments.

FIG. 13 shows an example of interweaved prediction with two dividing patterns in accordance with the disclosed embodiments. A current block 1300 can be divided into multiple patterns. For example, as shown in FIG. 13, the current block is divided into both Pattern 0 (1301) and Pattern 1 (1302). Two prediction blocks, $P_0$ (1303) and $P_1$ (1304), are generated. A final prediction block P (1305) of the current block 1300 can be generated by computing a weighted sum of $P_0$ (1303) and $P_1$ (1304).

More generally, given X dividing patterns, X prediction blocks of the current block, denoted as $P_0, P_1, \ldots, P_{X-1}$, can be generated by sub-block based prediction with the X dividing patterns. The final prediction of the current block, denoted as P, can be generated as $$P(x, y) = \frac{\sum_{i=0}^{X-1} w_i(x, y) \times P_i(x, y)}{\sum_{i=0}^{X-1} w_i(x, y)} \qquad \text{Eq. (15)}$$

Here, (x, y) is the coordinate of a pixel in the block and $w_i(x, y)$ is the weighting value of $P_i$. By the way of example, and not by limitation, the weights can be expressed as:

$$\sum_{i=0}^{X-1} w_i(x,y) = (1 << N) \qquad \text{Eq. (16)}$$

N is a non-negative value. Alternatively, the bit-shifting operation in Eq. (16) can also be expressed as:

$$\sum_{i=0}^{X-1} w_i(x,y) = 2^N \qquad \text{Eq. (17)}$$

The sum of the weights being a power of two allows a more efficient computation of the weighted sum P by performing a bit-shifting operation instead of a floating-point division.

Figure 14E:
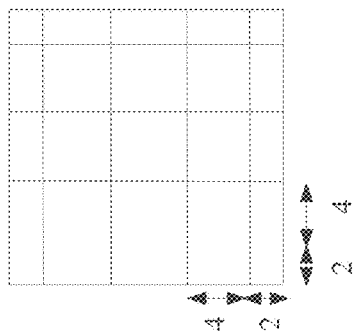
FIG. 14E shows an example dividing pattern in which a block is divided into non-uniform sub-blocks in accordance with the disclosed embodiments.
Figure 14F:
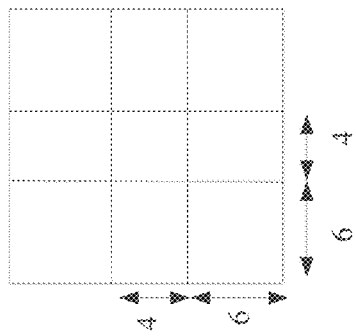
FIG. 14F shows another example dividing pattern in which a block is divided into non-uniform sub-blocks in accordance with the disclosed embodiments.
Figure 14G:
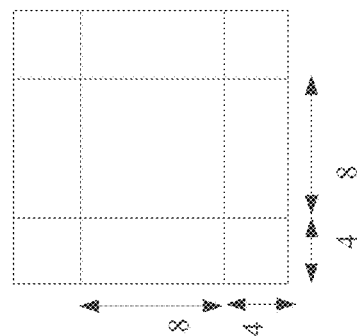
FIG. 14G shows yet another example dividing pattern in which a block is divided into non-uniform sub-blocks in accordance with the disclosed embodiments.

Dividing patterns can have different shapes, or sizes, or positions of sub-blocks. In some embodiments, a dividing pattern may include irregular sub-block sizes. FIGS. 14A-G show several examples of dividing patterns for a 16×16 block. In FIG. 14A, a block is divided into 4×4 sub-blocks in accordance with the disclosed embodiments. This pattern is also used in JEM. FIG. 14B shows an example of a block being divided into 8×8 sub-blocks in accordance with the disclosed embodiments. FIG. 14C shows an example of the block being divided into 8×4 sub-blocks in accordance with the disclosed embodiments. FIG. 14D shows an example of the block being divided into 4×8 sub-blocks in accordance with the disclosed embodiments. In FIG. 14E, a portion of the block is divided into 4×4 sub-blocks in accordance with the disclosed embodiments. The pixels at block boundaries are divided in smaller sub-blocks with sizes like 2×4, 4×2 or 2×2. Some sub-blocks may be merged to form larger sub-blocks. FIG. 14F shows an example of adjacent sub-blocks, such as 4×4 sub-blocks and 2×4 sub-blocks, that are merged to form larger sub-blocks with sizes like 6×4, 4×6 or 6×6. In FIG. 14G, a portion of the block is divided into 8×8 sub-blocks. The pixels at block boundaries are divided in smaller sub-blocks with sizes like 8×4, 4×8 or 4×4 instead.

The shapes and sizes of sub-blocks in sub-block based prediction can be determined based on the shape and/or size of the coding block and/or coded block information. Coded block information can include a type of coding algorithm used on the block and/or sub-block, such as whether the motion compensation prediction is (1) an affine prediction method, (2) an alternative temporal motion vector prediction method, (3) a spatial-temporal motion vector prediction method, (4) a bi-directional optical flow method, or (5) a frame-rate up conversion method. For example, in some embodiments, the sub-blocks have a size of 4×N (or 8×N, etc.) when the current block has a size of M×N. That is, the sub-blocks have the same height as the current block. In some embodiments, the sub-blocks have a size of M×4 (or M×8, etc.) when the current block has a size of M×N. That is, the sub-blocks have the same width as the current block. In some embodiments, the sub-blocks have a size of A×B with A>B (e.g., 8×4) when the current block has a size of M×N, where M>N. Alternatively, the sub-blocks can have the size of B×A (e.g., 4×8).

In some embodiments, the current block has a size of M×N. The sub-blocks have a size of A×B when M×N<=T (or Min(M, N)<=T, or Max(M, N)<=T, etc.), and the sub-blocks have a size of C×D when M×N>T (or Min(M, N)>T, or Max(M, N)>T, etc.), where A<=C and B<=D. For example, if M×N<=256, sub-blocks can be in a size of 4×4. In some implementations, the sub-blocks have a size of 8×8.

It is noted that the interweaved prediction techniques disclosed herein can be applied in one, some, or all coding techniques of sub-block based prediction. For example, the interweaved prediction techniques can be applied to affine prediction, while other coding techniques of sub-block based prediction (e.g., ATMVP, STMVP, FRUC or BIO) do not use the interweaved prediction. As another example, all of affine, ATMVP, and STMVP apply the interweaved prediction techniques disclosed herein.

Figure 15A:
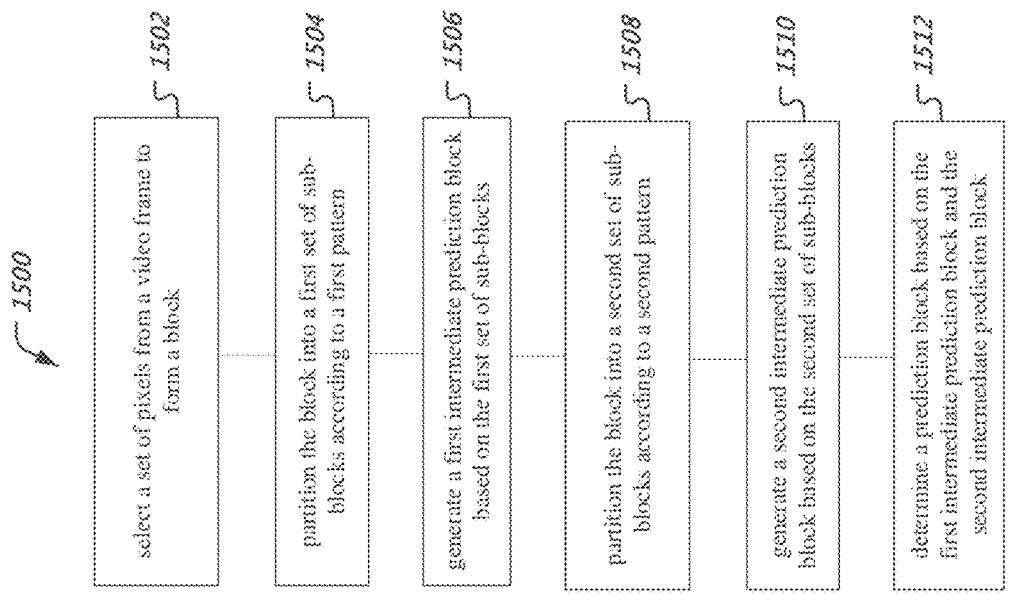
FIG. 15A is an example flowchart of a method of video processing.

FIG. 15A is an example flowchart of a method 1500 for improving motion compensation in a video system in accordance with the disclosed embodiments. The method 1500 includes, at 1502, selecting a set of pixels from a video frame to form a block. The method 1500 includes, at 1504, partitioning the block into a first set of sub-blocks according to a first pattern. The method 1500 includes, at 1506, generating a first intermediate prediction block based on the first set of sub-blocks. The method 1500 includes, at 1508, partitioning the block into a second set of sub-blocks according to a second pattern. At least one sub-block in the second set has a different dimension than a sub-block in the first set. The method 1500 includes, at 1510, generating a second intermediate prediction block based on the second set of sub-blocks. The method 1500 also includes, at 1512, determining a prediction block based on the first intermediate prediction block and the second intermediate prediction block.

In some embodiments, the method 1500 may be implemented without explicitly generating the intermediate prediction blocks. For example, the following operations may be performed for the generation of the prediction block: partitioning a video block into a first set of sub-blocks according to a first pattern, partitioning the video block into a second set of sub-blocks according to a second pattern, wherein at least one sub-block in the second set has a different size than a sub-block in the first set, and determining a prediction block that is a combination of a first intermediate prediction block predictively generated from the first set of sub-blocks and a second intermediate prediction block predictively generated from the second set of sub-blocks.

In some embodiments, the first intermediate prediction block or the second intermediate prediction block is generated using at least one of (1) an affine prediction method, (2) an alternative temporal motion vector prediction method, (3) a spatial-temporal motion vector prediction method, (4) a bi-directional optical flow method, or (5) a frame-rate up conversion method. Some example embodiments of these video coding methods have been disclosed in the present disclosure.

In some embodiments, the sub-blocks in the first or the second set have a rectangular shape. For example, the rectangular shape may refer to a non-square shape where widths and heights are not equal to each other. In some embodiments, the sub-blocks in the first set of sub-blocks have non-uniform shapes. In some embodiments, the sub-blocks in the second set of sub-blocks have non-uniform shapes. The non-uniform shapes, for example, may include sub-blocks having different sizes in the first (or the second) set.

In some embodiments, the method includes determining the first pattern or the second pattern based on a size of the video block. For example, a tall rectangular block may be split into multiple horizontal sub-blocks. In some cases, a rectangular block may be split into multiple square sized sub-blocks. In some embodiments, the method includes determining the first pattern or the second pattern based on information from a second block that is temporally or spatially adjacent to the video block. For example, in some cases, the first or the second pattern used for the video block may be exactly same as at least one temporal or spatial neighbor.

In some embodiments, partitioning the block into the first set of sub-blocks is performed for a motion compensation of the block in a first direction. In some embodiments, partitioning the block into the second set of sub-blocks is performed for a motion compensation of the block in a second direction. The first direction and/or the second direction may be, for example, a backward direction for predictive coding ("B prediction") or a forward direction for predictive coding ("P prediction").

In some embodiments, partitioning the block into the first set of sub-blocks and partitioning the block into the second set of sub-blocks are performed for a motion compensation of the block in a first direction. In some embodiments, the method further includes performing a motion compensation of the block in a second direction by partitioning the block into a third set of sub-blocks according to a third pattern, generating a third intermediate prediction block based on the third set of sub-blocks, partitioning the block into a fourth set of sub-blocks according to a fourth pattern, wherein at least one sub-block in the fourth set has a different size than a sub-block in the third set, generating a fourth intermediate prediction block based on the fourth set of sub-blocks, determining a second prediction block based on the third intermediate prediction block and the fourth intermediate prediction block, and determining a third prediction block based on the prediction block and the second prediction block.

In some embodiments, the method includes transmitting, to a coding device in the block-based motion compensation video system, information of the first pattern and the second pattern for partitioning the block. In some embodiments, transmitting the information of the first pattern and the second pattern is performed at one of: (1) a sequence level, (2) a picture level, (3) a view level, (4) a slice level, (5) a Coding Tree Unit, (6) a Largest Coding Unit level, (7) a Coding Unit level, (8) a Prediction Unit level, (10) a Tree Unit level, or (11) a region level.

In some embodiments, determining the prediction result includes applying a first set of weights to the first intermediate prediction block to obtain a first weighted prediction block, applying a second set weights to the second intermediate prediction block to obtain a second weighted prediction block, and computing a weighted sum of the first weighted prediction block and the second weighted prediction block to obtain the prediction block.

In some embodiments, the first set of weights or the second set of weights includes fixed-weight values. In some embodiments, the first set of weights or the second set of weights is determined based on information from another block that is temporally or spatially adjacent to the block. In some embodiments, the first set of weights or the second set of weights is determined using a coding algorithm used for generating the first prediction block or the second prediction block. In some implementations, at least one value in the first set of weights is different than another value in the first set of weights. In some implementations, at least one value in the second set of weights is different than another value in the second set of weights. In some implementations, a sum of the weights is equal to a power of two.

In some embodiments, the method includes transmitting the weights to a coding device in the block-based motion compensation video system. In some embodiments, transmitting the weights is performed at one of: (1) a sequence level, (2) a picture level, (3) a view level, (4) a slice level, (5) a Coding Tree Unit, (6) a Largest Coding Unit level, (7) a Coding Unit level, (8) a Prediction Unit level, (10) a Tree Unit level, or (11) a region level.

FIG. 15B is an example flowchart of a method 1550 for improving block-based motion compensation in a video system in accordance with the disclosed embodiments. The method 1550 includes, at 1552, selecting a set of pixels from a video frame to form a block. The method 1550 includes, at 1554, dividing the block into multiple sub-blocks based on a size of the block or information from another block that is spatially or temporally adjacent to the block. At least one sub-block of the multiple sub-blocks has a different size than other sub-blocks. The method 1550 also includes, at 1556, generating motion vector predictions by applying a coding algorithm to the multiple sub-blocks. In some embodiments, the coding algorithm includes at least one of (1) an affine prediction method, (2) an alternative temporal motion vector prediction method, (3) a spatial-temporal motion vector prediction method, (4) a bi-directional optical flow method, or (5) a frame-rate up conversion method.

An alternative method includes dividing a video block into multiple sub-blocks based on a size of the video block or a type of a coding algorithm associated with the video block, wherein one sub-block of the multiple sub-blocks has a different size than other sub-blocks of the multiple sub-blocks, generating motion vector predictions by applying the coding algorithm to the multiple sub-blocks, and performing further processing of the video block using the motion vector predictions.

Figure 18A:
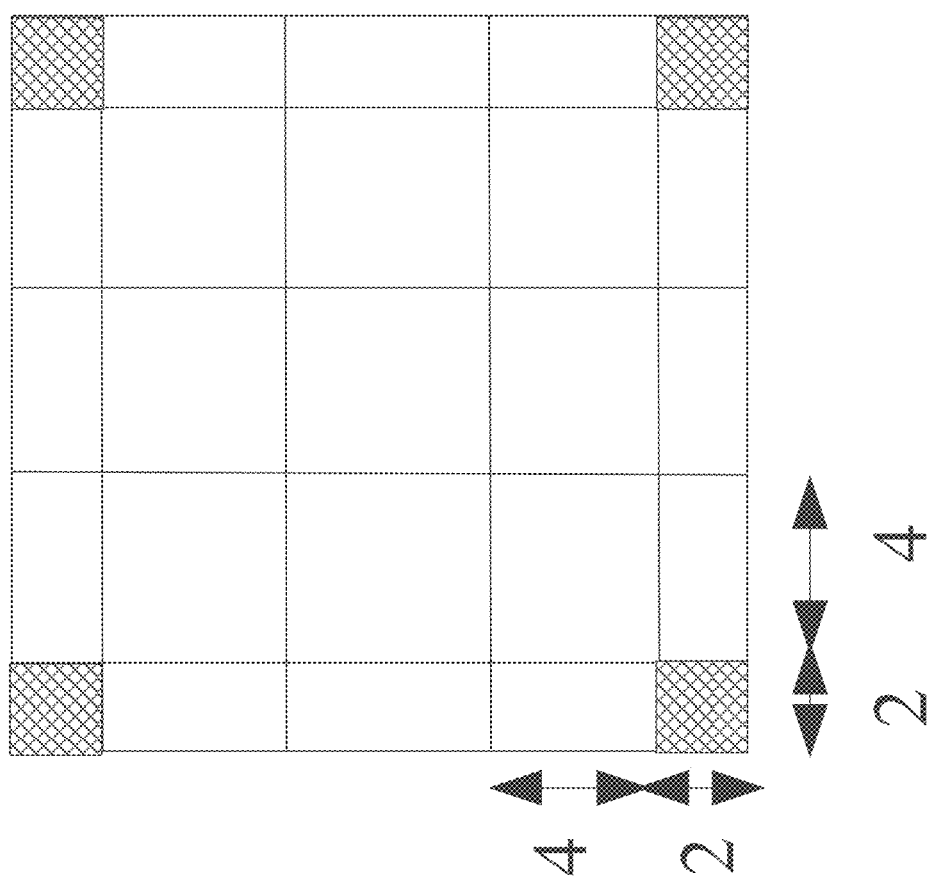
FIGS. 18A-18C show example embodiments of a partial interweaved prediction technique.
Figure 18B:
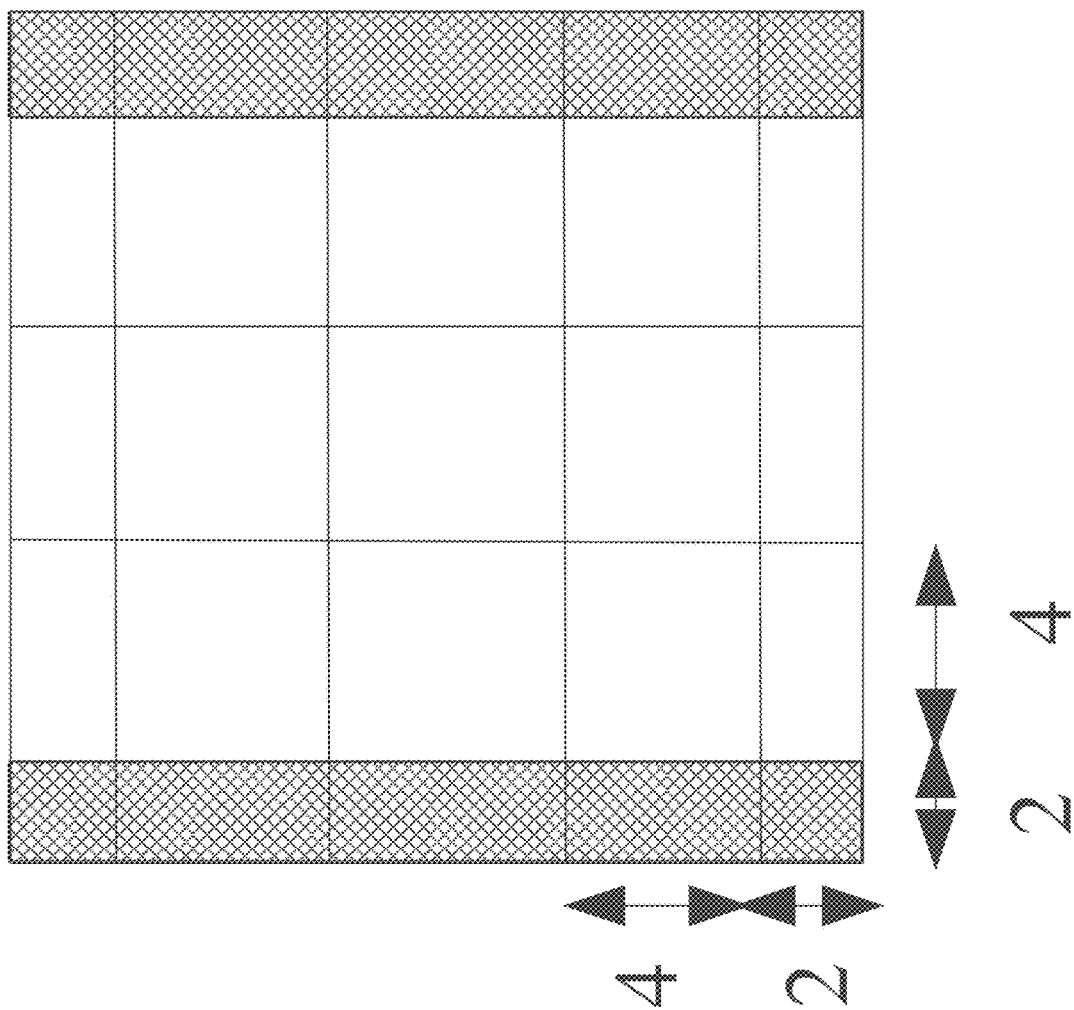
Figure 18C:
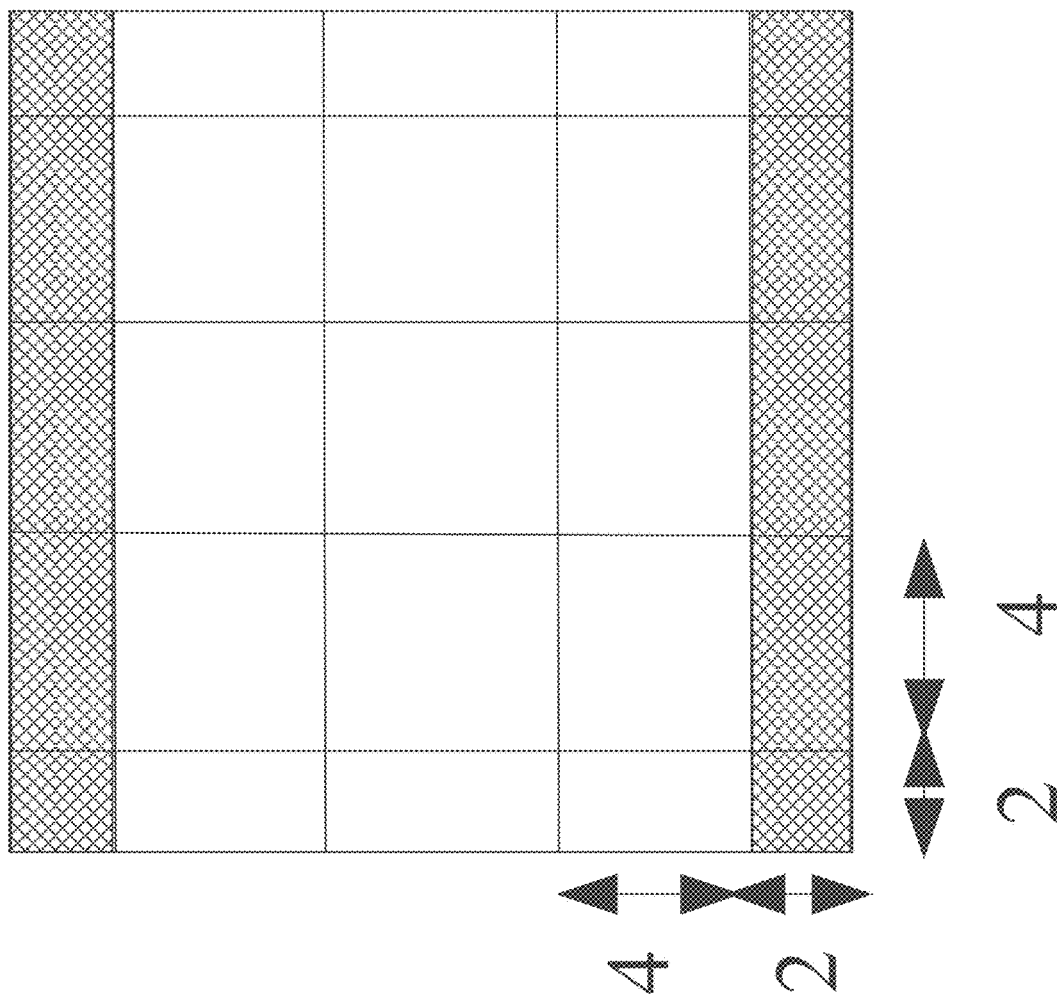

In the methods 1500 and 1550, partial interweaving may be implemented. Using this scheme, samples in a first subset of prediction samples are calculated as a weighted combination of the first intermediate prediction block and samples a second subset of the prediction samples are copied from sub-blocked based prediction wherein the first subset and the second subset are based on a dividing pattern. The first subset and the second subset may together make up the entire prediction block, e.g., the block that is currently being processed. As depicted in FIGS. 18A to 18C, in various examples, the second subset that is excluded from interweaving could be made up of (a) corner sub-blocks or (b) uppermost and lowermost row of sub-blocks or (c) left-most or right-most columns of sub-blocks. The size of the block being currently processed may be used as a condition for deciding whether to exclude certain sub-blocks from interweaved prediction. For example, certain conditions are described below.

As further described in the present disclosure, the encoding process may refrain from checking affine mode for blocks that are split from a parent block, where the parent block itself is encoded with a mode different from affine mode.

Figure 16:
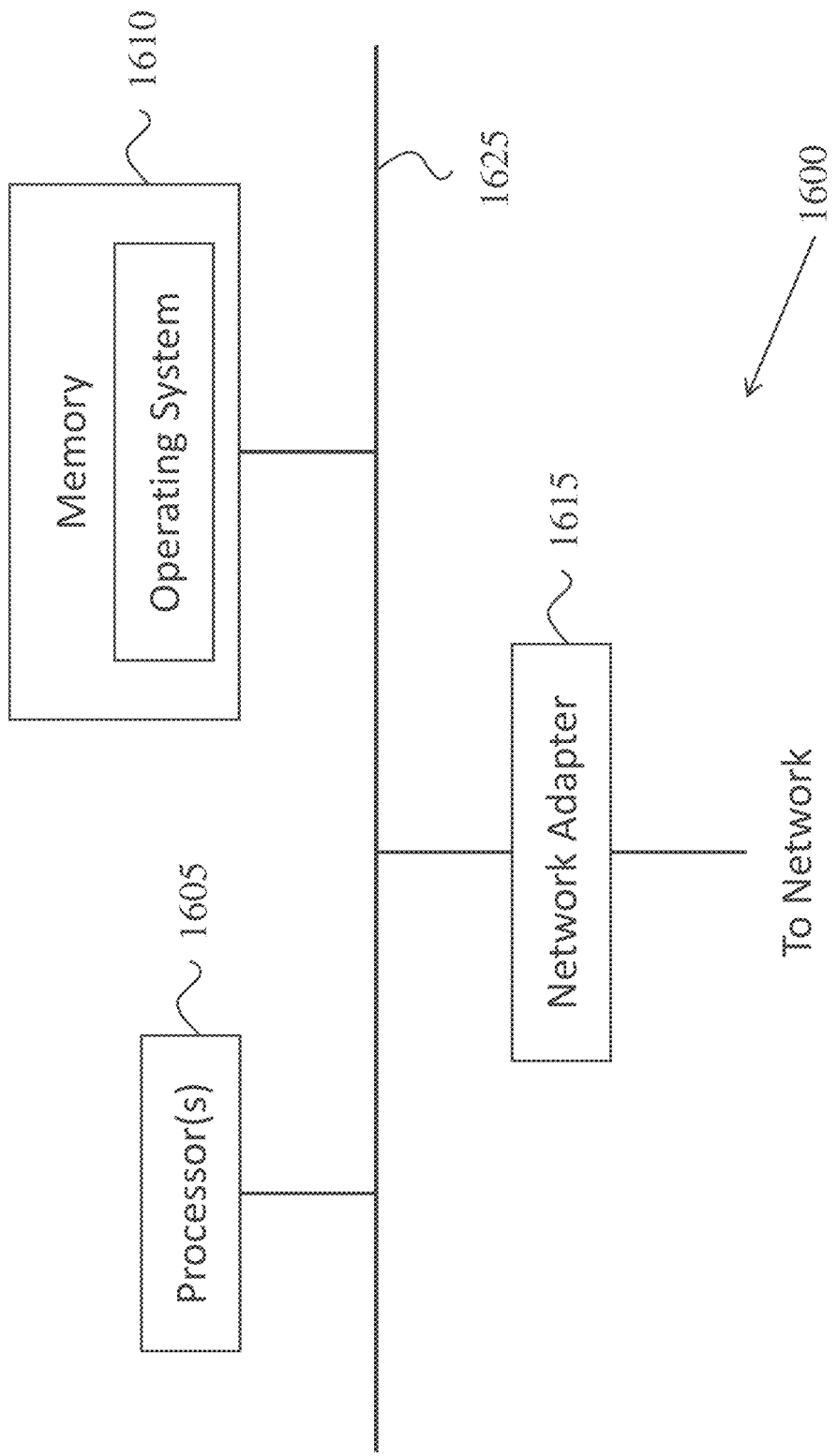
FIG. 16 is a block diagram illustrating an example of the architecture for a computer system or other control device that can be utilized to implement various portions of the presently disclosed embodiments.

FIG. 16 is a block diagram illustrating an example of the architecture for a computer system or other control device 1600 that can be utilized to implement various portions of the presently disclosed embodiments. In FIG. 16, the computer system 1600 includes one or more processors 1605 and memory 1610 connected via an interconnect 1625. The interconnect 1625 may represent any one or more separate physical buses, point to point connections, or both, connected by appropriate bridges, adapters, or controllers. The interconnect 1625, therefore, may include, for example, a system bus, a Peripheral Component Interconnect (PCI) bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 674 bus, sometimes referred to as "Firewire."

The processor(s) 1605 may include central processing units (CPUs) to control the overall operation of, for example, the host computer. In certain embodiments, the processor(s) 1605 accomplish this by executing software or firmware stored in memory 1610. The processor(s) 1605 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The memory 1610 can be or include the main memory of the computer system. The memory 1610 represents any suitable form of random access memory (RAM), read-only memory (ROM), flash memory, or the like, or a combination of such devices. In use, the memory 1610 may contain, among other things, a set of machine instructions which, when executed by processor 1605, causes the processor 1605 to perform operations to implement embodiments of the present disclosure.

Also connected to the processor(s) 1605 through the interconnect 1625 is a (optional) network adapter 1615. The network adapter 1615 provides the computer system 1600 with the ability to communicate with remote devices, such as the storage clients, and/or other storage servers, and may be, for example, an Ethernet adapter or Fiber Channel adapter.

Figure 17:
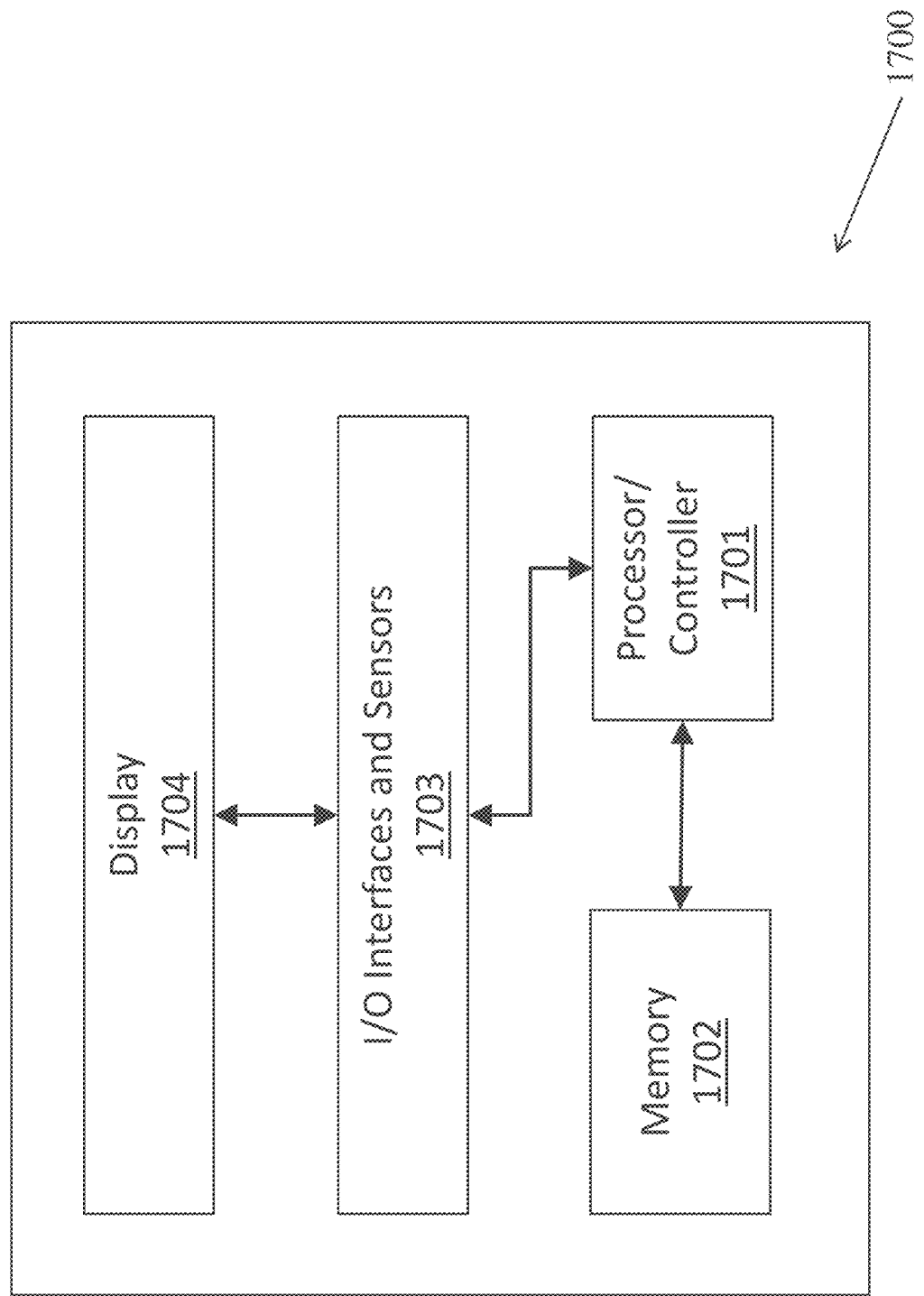
FIG. 17 shows a block diagram of an example embodiment of a mobile device that can be utilized to implement various portions of the presently disclosed embodiments.

FIG. 17 shows a block diagram of an example embodiment of a mobile device 1700 that can be utilized to implement various embodiments of the present disclosure. The mobile device 1700 can be a laptop, a smartphone, a tablet, a camcorder, or other types of devices that are capable of processing videos. The mobile device 1700 includes a processor or controller 1701 to process data, and memory 1702 in communication with the processor 1701 to store and/or buffer data. For example, the processor 1701 can include a central processing unit (CPU) or a microcontroller unit (MCU). In some implementations, the processor 1701 can include a field-programmable gate-array (FPGA). In some implementations, the mobile device 1700 includes or is in communication with a graphics processing unit (GPU), video processing unit (VPU) and/or wireless communications unit for various visual and/or communications data processing functions of the smartphone device. For example, the memory 1702 can include and store processor-executable code, which when executed by the processor 1701, configures the mobile device 1700 to perform various operations, e.g., such as receiving information, commands, and/or data, processing information and data, and transmitting or providing processed information/data to another device, such as an actuator or external display. To support various functions of the mobile device 1700, the memory 1702 can store information and data, such as instructions, software, values, images, and other data processed or referenced by the processor 1701. For example, various types of Random Access Memory (RAM) devices, Read Only Memory (ROM) devices, Flash Memory devices, and other suitable storage media can be used to implement storage functions of the memory 1702. In some implementations, the mobile device 1700 includes an input/output (I/O) unit 1703 to interface the processor 1701 and/or memory 1702 to other modules, units or devices. For example, the I/O unit 1703 can interface the processor 1701 and memory 1702 with to utilize various types of wireless interfaces compatible with typical data communication standards, e.g., such as between the one or more computers in the cloud and the user device. In some implementations, the mobile device 1700 can interface with other devices using a wired connection via the I/O unit 1703. The I/O unit 1703 may include wireless sensors such as infrared detectors for detecting remote control signals, or other suitable wireless human interface techniques. The mobile device 1700 can also interface with other external interfaces, such as data storage, and/or visual or audio display devices 1704, to retrieve and transfer data and information that can be processed by the processor, stored in the memory, or exhibited on an output unit of a display device 1704 or an external device. For example, the display device 1704 can display a video frame modified based on the MVPs (e.g., a video frame that includes the prediction block 1305 as shown in FIG. 13) in accordance with the disclosed embodiments.

In some embodiments, a video decoder apparatus may implement a method of video decoding in which the improved block-based motion prediction as described herein is used for video decoding. The method may include forming a block of video using a set of pixels from a video frame. The block may be partitioned into a first set of sub-blocks according to a first pattern. A first intermediate prediction block may correspond to the first set of sub-blocks. The block may include a second set of sub-blocks according to a second pattern. At least one sub-block in the second set has a different size than a sub-block in the first set. The method may further determine a prediction block based on the first intermediate prediction block and a second intermediate prediction block that is generated from the second set of sub-blocks. Other features of this method may be similar to the above-described method 1500.

In some embodiments, a decoder-side method of video decoding may use block-based motion prediction for improving video quality by using blocks of a video frame for prediction, where a block corresponds to a set of pixel blocks. The block may be divided into multiple sub-blocks based on a size of the block or information from another block that is spatially or temporally adjacent to the block, wherein at least one sub-block of the multiple sub-blocks has a different size than other sub-blocks. The decoder may use motion vector predictions that are generated by applying a coding algorithm to the multiple sub-blocks. Other features of this method are described with respect to FIG. 15B and the corresponding description.

In some embodiments, the video decoding methods may be implemented using a decoding apparatus that is implemented on a hardware platform as described with respect to FIG. 16 and FIG. 17.

Partial Interweaving

In some embodiments, partial interweaved prediction may be achieved as follow.

In some embodiments, interweaved prediction is applied to a part of the current block. Prediction samples at some positions are calculated as the weighted sum of two or more sub-block based predictions. Prediction samples at other positions are not used for the weighted sum. For example, these prediction samples are copied from the sub-block based prediction with a certain dividing pattern.

In some embodiments, the current block is predicted by sub-block based prediction P1 and P2 with dividing pattern D0 and dividing pattern D1, respectively. The final prediction is calculated as P=w0×P0+w1×P1. At some positions, w0≠0 and w1≠0. But at some other positions, w0=1 and w1=0, that is, interweaved prediction is not applied at those positions.

In some embodiments, interweaved prediction is not applied on four corner sub-blocks as shown in FIG. 18A.

In some embodiments, interweaved prediction is not applied on the left-most column of sub-blocks and right-most column of sub-blocks as shown in FIG. 18B.

In some embodiments, interweaved prediction is not applied on the top-most row of sub-blocks and bottom-most row of sub-blocks as shown in FIG. 18C.

Examples of Techniques Incorporated within Encoder Embodiments

In some embodiments, interweaved prediction is not applied in the motion estimation (ME) process.

For example, interweaved prediction is not applied in the ME process for the 6-parameter affine prediction.

For example, interweaved prediction is not applied in the ME process if the size of the current block satisfies certain conditions such as follows. Here, it is assumed that the width and height of the current block is W and H respectively and T, T1, T2 are integer values:

$W >= T1$ and $H >= T2$;

$W <= T1$ and $H <= T2$;

$W >= T1$ or $H >= T2$;

$W <= T1$ or $H <= T2$;

$W+H >= T$;

$W+H <= T$;

$W \times H >= T$; and/or $W \times H <= T$.

As described above with respect to FIGS. 18A-18B, the size of the block being currently processed may be used as a condition (e.g., according to the above conditions) for deciding whether to exclude certain sub-blocks from interweaved prediction.

For example, interweaved prediction is omitted in the ME process if the current block is split from a parent block, and the parent block does not choose affine mode at encoder.

Alternatively, affine mode is not checked at encoder if the current block is split from a parent block, and the parent block does not choose affine mode at encoder.

Table A illustrates example performance results using conventional 2×2 Affine prediction for a Random Access (RA) configuration.

TABLE A

Example Test Results from 2 × 2 Affine Prediction

| | Y | U | V | EncT | DecT |
|---|---|---|---|---|---|
| Class A1 | −0.11% | −0.18% | −0.09% | 139% | 111% |
| Class A2 | −0.9% | −0.85% | −0.68% | 142% | 125% |
| Class B | −0.58% | −0.51% | −0.67% | 136% | 114% |
| Class C | −0.26% | −0.24% | −0.24% | 129% | 108% |
| Class D | −0.54% | −0.52% | −0.53% | 130% | 118% |
| Class F | −0.89% | −1.02% | −0.97% | 125% | 108% |
| Overall | −0.47% | −0.44% | −0.44% | 136% | 114% |

Table B illustrates example performance results obtained by applying interweaved prediction on uni-prediction in accordance with an embodiment of the present disclosure. Table C illustrates example performance results obtained by applying interweaved prediction on bi-prediction in accordance with an embodiment of the present disclosure.

TABLE B

Example Test Results from Interleaved Prediction in Uni-prediction

| | Y | U | V | EncT | DecT |
|---|---|---|---|---|---|
| Class A1 | −0.05% | −0.14% | −0.02% | 101% | 100% |
| Class A2 | −0.55% | −0.17% | −0.11% | 102% | 101% |
| Class B | −0.33% | −0.17% | −0.20% | 101% | 101% |
| Class C | −0.15% | −0.16% | −0.04% | 100% | 100% |
| Class D | −0.21% | −0.09% | −0.02% | 106% | 106% |
| Class F | −0.39% | −0.40% | −0.39% | 102% | 102% |
| Overall | −0.27% | −0.16% | −0.11% | 101% | 101% |

TABLE C

Example Test Results from Interleaved Prediction in Bi-prediction

| | Y | U | V | EncT | DecT |
|---|---|---|---|---|---|
| Class A1 | −0.09% | −0.18% | −0.12% | 103% | 102% |
| Class A2 | −0.74% | −0.40% | −0.28% | 104% | 104% |
| Class B | −0.37% | −0.39% | −0.35% | 103% | 102% |
| Class C | −0.22% | −0.19% | −0.13% | 102% | 102% |
| Class D | −0.42% | −0.28% | −0.32% | 103% | 102% |
| Class F | −0.60% | −0.64% | −0.62% | 102% | 102% |
| Overall | −0.38% | −0.30% | −0.23% | 103% | 102% |

As shown in Table B and Table C, interweaved prediction achieves major coding gain with much lower complexity, compared to conventional 2×2 affine prediction based coding. In particular, interweaved prediction applied in bi-prediction achieves a coding gain of 0.38% as compared to 2×2 Affine method (0.47%). The encoding time and decoding time are 103% and 102% respectively as compared to 136% and 114% in the 2×2 Affine method.

FIG. 19 is a block diagram showing an example video processing system 1900 in which various embodiments disclosed herein may be implemented. Various implementations may include some or all of the components of the system 1900. The system 1900 may include input 1902 for receiving video content. The video content may be received in a raw or uncompressed format, e.g., 8- or 10-bit multi-component pixel values, or may be in a compressed or encoded format. The input 1902 may represent a network interface, a peripheral bus interface, or a storage interface. Examples of network interface include wired interfaces such as Ethernet, passive optical network (PON), etc. and wireless interfaces such as Wi-Fi or cellular interfaces. Examples of a peripheral bus interface may include universal serial bus (USB) or high definition multimedia interface (HDMI) or DisplayPort, and so on. Examples of storage interfaces include serial advanced technology attachment (SATA), peripheral component interconnect (PCI), integrated drive electronics (IDE) interface, and the like.

The system 1900 may include a coding component 1904 that may implement the various coding methods described in the present disclosure. The coding component 1904 may reduce the average bitrate of video from the input 1902 to the output of the coding component 1904. The coding techniques are therefore sometimes called video compression or video transcoding techniques. The output of the coding component 1904 may be either stored, or transmitted via a communication connected, as represented by the component 1906. The stored or communicated bitstream representation of the video received at the input 1902 may be used by the component 1906 for generating displayable video that is sent to a display interface 1908. The process of generating user-viewable video from the bitstream representation is sometimes called video decompression.

The embodiments described in the present disclosure may be embodied in various electronic devices such as mobile phones, laptops, smartphones or other devices that are capable of performing digital data processing and/or video display.

In one example aspect, a method of video processing includes partitioning a video block into a first set of sub-blocks according to a first pattern and partitioning the video block into a second set of sub-blocks according to a second pattern. At least one sub-block in the second set has a different dimension than a sub-block in the first set. The method also includes determining a prediction block that is a combination of a first intermediate prediction block generated from the first set of sub-blocks and a second intermediate prediction block generated from the second set of sub-blocks.

In some embodiments, the first intermediate prediction block or the second intermediate prediction block is generated using at least one of (1) an affine prediction method, (2) an alternative temporal motion vector prediction method, (3) a spatial-temporal motion vector prediction method, (4) a bi-directional optical flow method, or (5) a frame-rate up conversion method.

In some embodiments, the sub-blocks in the first or the second set have a rectangular shape. In some embodiments, the sub-blocks in the first set of sub-blocks have non-uniform shapes. In some embodiments, the sub-blocks in the second set of sub-blocks have non-uniform shapes.

In some embodiments, the method includes determining the first pattern or the second pattern based on a dimension of the video block. In some embodiments, the partitioning the video block into the first set of sub-blocks is performed for a motion compensation of the video block based on a reference picture in a first reference picture list. In some embodiments, the partitioning the block into the second set of sub-blocks is performed for a motion compensation of the video block based on a reference picture in a second reference picture list that is different from the first reference picture list. In some embodiments, the partitioning the video block into the second set of sub-blocks is performed for a motion compensation of the video block from a reference picture in a second reference picture list that is same as the first reference picture list. In some embodiments, the motion compensation of the video block from a reference picture in the second reference picture list is performed by partitioning the video block into a third set of sub-blocks according to a third pattern, generating a third intermediate prediction block based on the third set of sub-blocks, partitioning the video block into a fourth set of sub-blocks according to a fourth pattern, wherein at least one sub-block in the fourth set has a different dimension than a sub-block in the third set, generating a fourth intermediate prediction block based on the fourth set of sub-blocks, determining a second prediction block based on the third intermediate prediction block and the fourth intermediate prediction block, and determining a third prediction block based on the prediction block and the second prediction block.

In some embodiments, the prediction block is determined as a weighted combination of the first intermediate prediction block weighted using a first set of weights and the second intermediate prediction block weighted using a second set of weights. In some embodiments, the first set of weights or the second set of weights includes fixed-weight values. In some embodiments, at least one value in the first set of weights is different than another value in the first set of weights. In some embodiments, at least one value in the second set of weights is different than another value in the second set of weights.

In another example aspect, a video processing method includes dividing a video block into multiple sub-blocks based on a dimension of the video block or a type of a coding algorithm associated with the video block. One sub-block of the multiple sub-blocks has a different dimension than other sub-blocks of the multiple sub-blocks. The method also includes generating motion vector predictions by applying the coding algorithm to the multiple sub-blocks and performing further processing of the video block using the motion vector predictions.

In some embodiments, the coding algorithm includes at least one of (1) an affine prediction method, (2) an alternative temporal motion vector prediction method, (3) a spatial-temporal motion vector prediction method, (4) a bi-directional optical flow method, or (5) a frame-rate up conversion method. In some embodiments, dimensions of the video block are M×N, wherein M>N, a particular sub-block of the video block has a size A×B, wherein A>B, and where M, N, A and B are integers. In some embodiments, dimensions of the block are M×N, wherein M<=N, a particular sub-block of the video block has a size A×B, wherein A<=B. In some embodiments, the method includes performing a prediction for each sub-block in the first set of sub-blocks to determine the first intermediate prediction block. In some embodiments, the method includes performing a prediction for each sub-block in the second set of sub-blocks to determine the second intermediate prediction block.

From the foregoing, it will be appreciated that specific embodiments of the present disclosure have been described herein for purposes of illustration, but that various modifications may be made without deviating from the scope of the invention. Accordingly, the presently disclosed embodiments are not limited except as by the appended claims.

The disclosed and other embodiments, modules and the functional operations described in the present disclosure can be implemented in digital electronic circuitry, or in computer software, firmware, or hardware, including the structures disclosed in the present disclosure and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in the present disclosure can be performed by one or more programmable processors executing one or more computer programs to perform functions by operating on input data and generating output. The processes and logic flows can also be performed by, and apparatus can also be implemented as, special purpose logic circuitry, e.g., a field-programmable gate array (FPGA) or an application-specific integrated circuit (ASIC).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., erasable programmable read-only memory (EPROM), electronically erasable programmable read-only memory (EEPROM), and flash memory devices; magnetic disks, e.g., internal hard disks or removable disks; magneto optical disks; and compact disc, read-only memory (CD ROM) and digital versatile disc, read-only memory (DVD-ROM) disks. The processor and the memory can be supplemented by, or incorporated in, special purpose logic circuitry.

While the present disclosure contains many specifics, these should not be construed as limitations on the scope of any invention or of what may be claimed, but rather as descriptions of features that may be specific to particular embodiments of particular inventions. Certain features that are described in the present disclosure in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in the present disclosure should not be understood as requiring such separation in all embodiments.

Only a few implementations and examples are described and other implementations, enhancements and variations can be made based on what is described and illustrated in the present disclosure.

What is claimed is:

1. A method of video processing, comprising:
   partitioning, for a conversion between a video block of a video and a bitstream of the video, the video block into a first set of sub-blocks according to a first pattern;
   partitioning the video block into a second set of sub-blocks according to a second pattern, wherein at least one sub-block in the second set has a different dimension than a sub-block in the first set, and wherein the first pattern and the second pattern are determined based on a dimension of the video block;
   determining a prediction block for the video block, wherein the prediction block is a combination of a first intermediate prediction block generated from the first set of sub-blocks and a second intermediate prediction block generated from the second set of sub-blocks; and
   performing the conversion based on the determining.

2. The method of claim 1, wherein the first intermediate prediction block or the second intermediate prediction block is generated using at least one of (1) an affine prediction method, (2) an alternative temporal motion vector prediction method, (3) a spatial-temporal motion vector prediction method, (4) a bi-directional optical flow method, or (5) a frame-rate up conversion method.

3. The method of claim 1, wherein the sub-blocks in the first or the second set have a rectangular shape.

4. The method of claim 1, wherein the sub-blocks in the first or the second set have non-uniform shapes.

5. The method of claim 1, wherein partitioning the video block into the first set of sub-blocks is performed for a motion compensation of the video block based on a reference picture in a first reference picture list, and partitioning the video block into the second set of sub-blocks is performed for a motion compensation of the video block based on a reference picture in a second reference picture list that is different from the first reference picture list.

6. The method of claim 1, wherein partitioning the video block into the first set of sub-blocks is performed for a motion compensation of the video block based on a reference picture in a first reference picture list, and partitioning the video block into the second set of sub-blocks is performed for a motion compensation of the video block from a reference picture in a second reference picture list that is same as the first reference picture list.

7. The method of claim 6, wherein the motion compensation of the video block from a reference picture in the second reference picture list is performed by:
partitioning the video block into a third set of sub-blocks according to a third pattern;
generating a third intermediate prediction block based on the third set of sub-blocks;
partitioning the video block into a fourth set of sub-blocks according to a fourth pattern, wherein at least one sub-block in the fourth set has a different dimension than a sub-block in the third set;
generating a fourth intermediate prediction block based on the fourth set of sub-blocks;
determining a second prediction block based on the third intermediate prediction block and the fourth intermediate prediction block; and
determining a third prediction block based on the prediction block and the second prediction block.

8. The method of claim 1, wherein the prediction block is determined as a weighted combination of the first intermediate prediction block weighted using a first set of weights and the second intermediate prediction block weighted using a second set of weights.

9. The method of claim 8, wherein the first set of weights or the second set of weights includes fixed-weight values.

10. The method of claim 9, wherein at least one value in the first set of weights is different than another value in the first set of weights.

11. The method of claim 10, wherein at least one value in the second set of weights is different than another value in the second set of weights.

12. The method of claim 1, further comprising performing a prediction for each sub-block in the first set of sub-blocks to determine the first intermediate prediction block.

13. The method of claim 1, further comprising performing a prediction for each sub-block in the second set of sub-blocks to determine the second intermediate prediction block.

14. The method of claim 1, wherein the conversion includes encoding the video block into the bitstream.

15. The method of claim 1, wherein the conversion includes decoding the video block from the bitstream.

16. A video processing apparatus comprising a processor and a non-transitory memory with instructions thereon, wherein the instructions upon execution by the processor, cause the processor to:
partition, for a conversion between a video block of a video and a bitstream of the video, the video block into a first set of sub-blocks according to a first pattern;
partition the video block into a second set of sub-blocks according to a second pattern, wherein at least one sub-block in the second set has a different dimension than a sub-block in the first set, and wherein the first pattern and the second pattern are determined based on a dimension of the video block;
determine a prediction block for the video block, wherein the prediction block is a combination of a first intermediate prediction block generated from the first set of sub-blocks and a second intermediate prediction block generated from the second set of sub-blocks; and
perform the conversion based on the determining.

17. The video processing apparatus of claim 16, wherein the first intermediate prediction block or the second intermediate prediction block is generated using at least one of (1) an affine prediction method, (2) an alternative temporal motion vector prediction method, (3) a spatial-temporal motion vector prediction method, (4) a bi-directional optical flow method, or (5) a frame-rate up conversion method.

18. The video processing apparatus of claim 16, wherein the sub-blocks in the first or the second set have a rectangular shape, or the sub-blocks in the first or the second set have non-uniform shapes.

19. A non-transitory computer-readable recording medium storing a bitstream of a video which is generated by a method performed by a video processing apparatus, wherein the method comprises:
partitioning a video block into a first set of sub-blocks according to a first pattern;
partitioning the video block into a second set of sub-blocks according to a second pattern, wherein at least one sub-block in the second set has a different dimension than a sub-block in the first set, and wherein the first pattern and the second pattern are determined based on a dimension of the video block;
determining a prediction block for the video block, wherein the prediction block is a combination of a first intermediate prediction block generated from the first set of sub-blocks and a second intermediate prediction block generated from the second set of sub-blocks; and
generating the bitstream based on the determining.

* * * * *